United States Patent
Ando et al.

(10) Patent No.: US 10,155,522 B2
(45) Date of Patent: Dec. 18, 2018

(54) VEHICLE DRIVE SYSTEM HAVING IMPROVED SWITCHING BETWEEN TWO WHEEL DRIVE AND ALL WHEEL DRIVE

(71) Applicant: HONDA MOTOR CO., LTD., Tokyo (JP)

(72) Inventors: Satoshi Ando, Wako (JP); Masayuki Kikuchi, Wako (JP); Masatoshi Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 2 days.

(21) Appl. No.: 14/915,071

(22) PCT Filed: Dec. 24, 2014

(86) PCT No.: PCT/JP2014/084086
§ 371 (c)(1),
(2) Date: Feb. 26, 2016

(87) PCT Pub. No.: WO2015/098933
PCT Pub. Date: Jul. 2, 2015

(65) Prior Publication Data
US 2016/0288792 A1 Oct. 6, 2016

(30) Foreign Application Priority Data

Dec. 27, 2013 (JP) .................. 2013-271976

(51) Int. Cl.
*B60L 9/00* (2006.01)
*B60L 11/00* (2006.01)
(Continued)

(52) U.S. Cl.
CPC ............ *B60W 30/182* (2013.01); *B60K 6/24* (2013.01); *B60K 6/26* (2013.01); *B60K 6/365* (2013.01);
(Continued)

(58) Field of Classification Search
CPC ........... B60W 30/182; G05D 1/00; B60T 8/32
(Continued)

(56) References Cited

U.S. PATENT DOCUMENTS

2005/0173179 A1* 8/2005 Amanuma ............... B60K 6/44
180/247
2007/0222289 A1* 9/2007 Fukuda ................. B60T 8/1766
303/192
(Continued)

FOREIGN PATENT DOCUMENTS

EP 1 205 331 A2 5/2002
JP 2004-112851 A 4/2004
(Continued)

OTHER PUBLICATIONS

English Translation for JP2004112851A.*
(Continued)

*Primary Examiner* — Mahmoud S Ismail
(74) *Attorney, Agent, or Firm* — Westerman, Hattori, Daniels & Adrian, LLP

(57) ABSTRACT

A vehicle drive system, that can improve drive efficiency while maintaining vehicle stability, includes a step (S3, S105) in which a switch is made from 2WD to AWD on the basis of a cumulative slip point; a step (S12, S303) in which a switch is made from 2WD to AWD on the basis of a calculated lateral G; a step (S13, S109, S111) in which a switch is made from AWD to 2WD after the step (S3 or S105) under a first switching condition; and a step (S13, S306, S308) in which a switch is made from AWD to 2WD after the step (S12 or S303) under a second switching condition. The first switching condition and the second switching condition differ from one another.

8 Claims, 12 Drawing Sheets

(51) Int. Cl.
    *G05D 1/00*     (2006.01)
    *G05D 3/00*     (2006.01)
    *G06F 7/00*     (2006.01)
    *G06F 17/00*     (2006.01)
    *B60K 23/08*     (2006.01)
    *B60W 30/182*     (2012.01)
    *B60K 6/44*     (2007.10)
    *B60K 6/52*     (2007.10)
    *B60W 20/00*     (2016.01)
    *B60K 6/24*     (2007.10)
    *B60K 6/26*     (2007.10)
    *B60K 6/365*     (2007.10)
    *B60K 6/383*     (2007.10)
    *B60K 6/485*     (2007.10)
    *B60W 30/18*     (2012.01)
    *B60T 8/32*     (2006.01)
    *B60K 17/354*     (2006.01)
    *B60K 17/356*     (2006.01)

(52) U.S. Cl.
    CPC ............... *B60K 6/383* (2013.01); *B60K 6/44* (2013.01); *B60K 6/485* (2013.01); *B60K 6/52* (2013.01); *B60K 23/08* (2013.01); *B60W 20/00* (2013.01); *B60W 30/18172* (2013.01); *B60K 17/356* (2013.01); *B60K 2023/085* (2013.01); *B60W 2520/125* (2013.01); *B60W 2520/26* (2013.01); *B60W 2520/263* (2013.01); *B60W 2720/40* (2013.01); *B60Y 2200/92* (2013.01); *B60Y 2300/182* (2013.01); *B60Y 2300/18175* (2013.01); *Y02T 10/623* (2013.01); *Y02T 10/6265* (2013.01); *Y10S 903/905* (2013.01); *Y10S 903/906* (2013.01); *Y10S 903/91* (2013.01); *Y10S 903/913* (2013.01)

(58) Field of Classification Search
    USPC .............................. 701/22; 180/247; 303/192
    See application file for complete search history.

(56) References Cited

U.S. PATENT DOCUMENTS

| | | |
|---|---|---|
| 2009/0024262 A1 | 1/2009 | Amamiya |
| 2011/0172863 A1 | 7/2011 | Yu et al. |
| 2011/0257826 A1 | 10/2011 | Yu et al. |
| 2015/0014081 A1 | 1/2015 | Noguchi |

FOREIGN PATENT DOCUMENTS

| | | | |
|---|---|---|---|
| JP | 2004112851 A | * | 4/2004 |
| JP | 2007-137307 A | | 6/2007 |
| JP | 2012-240471 A | | 12/2012 |
| WO | 2013/146057 A1 | | 10/2013 |

OTHER PUBLICATIONS

International Search Report dated Mar. 24, 2015, issued in counterpart Application No. PCT/JP2014/084086 (1 page).
Supplementary search report dated Aug. 16, 2017, issued in counterpart European Application No. 14874874.2 (15 pages).

* cited by examiner

|  | S1105 WHEEL ACCELERATION THRESHOLD | S1107 COUNTER VALUE THRESHOLD |
| --- | --- | --- |
| S1 STABLE TRAVEL DETERMINATION IN FIRST JUDGMENT SUBROUTINE | SMALL | LARGE |
| S10 STABLE TRAVEL DETERMINATION IN SECOND JUDGMENT SUBROUTINE | LARGE | SMALL |

FIG. 10

VEHICLE DRIVE SYSTEM HAVING IMPROVED SWITCHING BETWEEN TWO WHEEL DRIVE AND ALL WHEEL DRIVE

TECHNICAL FIELD

The present invention relates to a vehicle drive system. In more detail, it relates to a vehicle drive system that causes switching from an both side wheel (all-wheel) drive state to a one side wheel independent drive state after switching to both side wheel drive state to differ according the two states of during slip occurrence and during vehicle driving.

BACKGROUND ART

Conventionally, technology has been proposed that, in a case of there being a wheel speed difference in either of between the front/rear wheels or between left/right wheels of an electric four-wheel drive vehicle, determines as excessive slip of wheels occurring exceeding the permissible limit, and performs switching from an independent one side wheel drive state (2WD) to an both side wheel (all-wheel) drive state (AWD) (for example, refer to Patent Document 1). In addition, with Patent Document 1, in a case of being a state in which there is wheel speed difference during vehicle stop, takeoff is performed in AWD upon subsequent takeoff.

According to Patent Document 1, AWD is performed only in a case of a wheel speed difference occurring in either of between left/right and front/rear wheels, and having determined as being necessary to perform AWD. AWD is thereby stopped in a case of there being no AWD necessity, even if the driver designates AWD. For this reason, it has been said to be able suppress useless wear on the motor brushes, as well as able to prolong the motor life and improve fuel consumption and electrical cost (hereinafter referred to as "driving efficiency").

Patent Document 1: Japanese Unexamined Patent Application, Publication No. 2007-137307

SUMMARY OF THE INVENTION

Problems to be Solved by the Invention

However, with the technology of the aforementioned patent document, 2WD is only switched to from AWD in the case of the vehicle speed being "0 km/h", and a predetermined time having elapsed. For this reason, the switching from AWD to 2WD has been restricted. In addition, if assuming to permit the switching from AWD to 2D during travel, for example, the switching to 2WD would also be permitted in a case of the vehicle movement like revolution direction movement or lateral movement of the vehicle being great, case in which the state of the vehicle leads to an oversteering tendency, etc., and thus it may not be possible to ensure 2WD operating stability and running performance (hereinafter referred to as "vehicle stability"). In addition, the driving efficiency may deteriorate by 2WD not being permitted during travel except, for such cases.

The present invention has been made in order to solve the above-mentioned problems, and an object thereof is to provide a vehicle drive system that can improve driving efficiency while ensuring vehicle stability, by performing switching from an both side wheel drive state of the vehicle to a one side wheel independent drive state at a more appropriate timing.

Means for Solving the Problems

In order to achieve the above-mentioned objects, the present invention is a vehicle drive system (e.g., the vehicle drive system 10 described later) is characterized by including: a first drive device (e.g., the first drive device 1 described later) that drives a first drive wheel (e.g., the front wheels Wf, Wf described later) which is either one of a front wheel (e.g., the front wheels Wf, Wf described later) and a rear wheel (e.g., the rear wheel Wr (RWr, LWr described later) of a vehicle (e.g., the vehicle 3 described later); a second drive device (e.g., the second drive device 2 described later) that drives a second drive wheel (e.g., the rear wheels Wr (RWr, LWr) described later) which is the other one of the front wheel and the rear wheel of the vehicle; and a control device (e.g., the ECU 6 described later) that controls the first drive device and the second drive device, and controls a drive state of the first drive wheel and the second drive wheel, in which the control unit includes: a slip-correlation-amount acquisition means (e.g., the first judgment unit 61 described later) for acquiring a slip-correlation amount (e.g., the integrated slip point described later) correlated with excessive slip occurring in the vehicle; a vehicle-movement-correlation amount acquisition means (e.g., the second judgment unit 62 described later) for acquiring a vehicle-movement correlation amount (e.g., the calculated "lateral G" described later) correlated with turning direction movement, or lateral movement, of the vehicle; and a drive-state switching means (e.g., the drive-state switching unit 64 described later) for switching between an independent one side wheel drive state (e.g., 2WD (FWD, RWD) described later) driving the vehicle by only either one of the first drive device or the second drive device, and an both side wheel drive state (e.g., AWD described later) driving the vehicle by both of the first, drive device and the second drive device, in which the drive-state switching means executes: first both side wheel drive switching processing (e.g., Steps S3, S105 described later) to switch from the independent one side wheel drive state to the both side wheel drive state, based on the slip-correlation amount acquired by the slip-correlation-amount acquisition means; second both side wheel drive switching processing (e.g., Steps S12, S303 described later) to switch from the independent one side wheel drive state to the both side wheel drive state, based on the vehicle-movement correlation value acquired by the vehicle-movement-correlation amount acquisition means; first independent one side wheel drive switching processing (e.g., Steps S13, S109, S111 described later) to switch from the both side wheel drive state to the independent one side wheel drive state with a first switching condition, after the first both side wheel drive switching processing; and second independent one side wheel drive switching processing (e.g., Steps S13, S308 described later) to switch from the both side wheel drive state to the independent one side wheel drive state with a second switching condition, after the second both side wheel drive switching processing, in which the first switching condition and the second switching condition differ from one another.

In the present invention, after the first both side wheel drive state switching processing for switching from the independent one side wheel drive state to the both side wheel drive state based on the slip-correlation amount acquired by the slip-correlation-amount acquisition means, the first independent one side wheel drive switching processing is performed for switching from the both side wheel drive state to the independent one side wheel drive state with the first switching condition. In addition, after the second both side wheel drive switching processing for switching from the independent one side wheel drive state to the both side wheel drive state based on the vehicle-movement correlation amount acquired by the vehicle-movement-correlation amount acquisition means, the second independent one side wheel drive switching processing is performed for switching from the both side wheel drive state to the independent one side wheel drive state with the second switching condition. Then, the first-switching condition and the second switching condition are made to differ from one another.

It is thereby possible to switch from both side wheel drive state to the independent one side wheel drive state at a more appropriate timing, due to switching to the independent one side wheel drive state based on the previous first both side wheel drive switching processing or second both side wheel drive switching processing.

For example, in the case of performing the first independent one side wheel drive switching processing after the first both side wheel drive switching processing based on the slip-correlation amount acquired by the slip-correlation-amount acquisition means, it is possible to switch to the independent one side wheel drive state at a timing at which the excessive slip phenomenon occurring in the vehicle is eliminated. For this reason, it enters the independent one side wheel drive state at a timing at which the first switching condition tuned to the road surface departing from a road surface of low μ state is established, and thus can ensure vehicle stability.

In the case of performing the second independent one side wheel drive switching processing after the second both side wheel drive switching processing based on the vehicle-movement correlation amount acquired by the vehicle-movement-correlation amount acquisition means, it is possible to switch to independent one side wheel drive state at the timing at which establishing the second switching condition at which the vehicle movement state in which the vehicle performs turning direction movement or lateral movement is relaxed. For this reason, it enters the independent one side wheel drive state at a timing at which the vehicle movement state is relaxed, and thus it is possible to ensure vehicle stability.

In addition, the timing of switching to the first independent one side wheel drive switching processing or the second independent one side wheel drive switching processing is a case of stable travel being determined, and thus with the drive-state switching means, it is not limited to the vehicle being stopped or traveling. For this reason, the switching from the both side wheel drive state to the independent one side wheel drive state becomes a timing adapted according to various cases, and thus can ensure vehicle stability. Switching from the both side wheel drive state to the independent one side wheel drive state is thereby effectively performed while ensuring vehicle stability at a more appropriate timing, not only when the vehicle is stopped, but also when traveling, and thus it is possible to improve driving efficiency.

It is favorable for the drive-state switching means to switch to the both side wheel drive state after the first, both side wheel drive switching processing, in a case of a condition for the first both side wheel drive switching processing being established in the both side wheel drive state after the second both side wheel drive switching processing, and execute the independent one side wheel drive switching processing with the first switching condition.

In the present invention, the drive-state switching means switches to the both side wheel drive state after the first both side wheel drive state switching processing, in the case of the condition of the first both side wheel drive switching processing being established in the both side wheel drive state after the second both side wheel drive state switching processing, and executes the first independent one side wheel drive switching processing with the first switching condition.

Herein, generally, the vehicle has a tendency for vehicle stability to decline more with the both side wheel drive state corresponding to the excessive slip phenomenon than the both side wheel drive state corresponding to the vehicle movement state such as turning direction movement or lateral movement of the vehicle. According to the present invention, in the case of the excessive slip phenomenon occurring in the both side wheel drive state corresponding to the vehicle movement state such as turning direction movement or lateral movement of the vehicle, it switches to the both side wheel drive state corresponding to the excessive slip phenomenon for which there is a tendency for vehicle stability to further decline. Then, it executes switching to the first independent one side wheel drive state from the both side wheel drive state switched to correspond to the excessive slip phenomenon for which there is a tendency for vehicle stability to further decline, whereby it is possible to further ensure vehicle stability.

It is favorable for the drive-state switching means to set the first switching condition as a condition for which switching is more difficult than the second switching condition.

In the present invention, the drive-state switching means sets the first switching condition to a condition for which it is more difficult to switch than the second switching condition.

Herein, generally, the vehicle has a tendency for vehicle stability to decline more with the both side wheel drive state corresponding to the excessive slip phenomenon than the both side wheel drive state corresponding to the vehicle movement state such as turning direction movement or lateral movement of the vehicle. According to the present invention, the first, switching condition is set as a condition that is more difficult to switch than the second switching condition, and thus it is difficult to switch to the independent one side wheel drive state from the both side wheel drive state switched to correspond to the excessive slip phenomenon which has a tendency for the vehicle stability to decline using the first switching condition, and thus vehicle stability can be further ensured.

It is favorable the drive-state switching means to execute the first independent one side wheel drive switching processing based on the slip-correlation amount acquired by the slip-correlation-amount acquisition means and a speed correlation amount of the vehicle, in a case of the speed correlation amount (e.g., the vehicle speed described later) of the vehicle becoming no more than a first speed threshold (e.g., the vehicle speed (0 km/h) (while stopped) described later).

In the present invention, the drive-state switching means executes the first independent one side wheel switching processing based on the slip-correlation amount acquired by the slip-correlation-amount acquisition means and the speed-correlation amount of the vehicle, in the case of the speed-correlation amount of the vehicle becoming no more than the first speed threshold.

Herein, the slip-correlation-amount acquisition means causes the slip-correlation amount to decline when the speed-correlation amount of the vehicle declines. It should be noted that the first speed threshold whereby it may be determined that the vehicle stability is stable irrespective of excessive slip occurring in the vehicle by the speed-correlation amount of the vehicle declining, for example, is exemplified as the speed of "0 km/h" at which the vehicle is stopped, or the like. According to the present invention, in the case of the speed-correlation amount of the vehicle that causes the slip-correlation amount acquired by the slip-correlation amount acquisition means to decline becoming no more than the first speed threshold, since the precision of the switching judgment is raised by adding a switching condition with the slip-correlation amount acquired by the slip-correlation-amount acquisition means and the speed-correlation amount of the vehicle as parameters, it is possible to further secure vehicle stability.

The present invention is a vehicle drive system (e.g., the vehicle drive system 10 described later) is characterized by including: a first drive device (e.g., the first drive device 1 described later) that drives a first drive wheel which is either one of a front wheel (e.g., the front wheels Wf, Wf described later) and a rear wheel (e.g., the rear wheel Wr (RWr, LWr described later) of a vehicle (e.g., the vehicle 3 described later); a second drive device (e.g., the second drive device 2 described later) that drives a second drive wheel (e.g., the rear wheels Wr (RWr, LWr) described later) which is the other one of the front wheel and the rear wheel of the vehicle; and a control device (e.g., the ECU 6 described later) that controls the first drive device and the second drive device, and controls a drive state of the first-drive wheel and the second drive wheel, in which the control unit includes: a drive-state switching means for switching between an independent one side wheel drive state (e.g., 2WD (FWD, RWD) described later) driving the vehicle by only either one of the first drive device or the second drive device, and an both side wheel drive state (e.g., AMD described later) driving the vehicle by both of the first drive device and the second drive device, in which the drive-state switching means, in a case of the speed correlation amount (e.g., the vehicle speed described later) of the vehicle becoming no more than the first speed threshold (e.g., the vehicle speed (0 km/h) (stopped) described later) in the both side wheel drive state, maintains the both side wheel drive state or inhibits switching to the independent one side wheel drive state, until reaching at least a second speed threshold (e.g., the vehicle speed threshold A described later) set to be at least the first speed threshold.

In the present invention, the drive-state switching means, in the case of the speed-correlation amount of the vehicle becoming no more than the first speed threshold in the both side wheel drive state, maintains the both side wheel drive state or inhibits switching to the independent one side wheel drive state, until becoming at least the second speed threshold set to be at least the first speed threshold.

Herein, the control device may determine that the vehicle stability is stable irrespective of excessive slip occurring in the vehicle, etc., when speed-correlation amount of the vehicle declines. It should be noted that the first speed threshold whereby it may be determined that the vehicle stability is stable irrespective of excessive slip occurring in the vehicle, etc., by the speed-correlation amount of the vehicle declining, for example, is exemplified as the speed of "0 km/h" at which the vehicle is stopped, or the like. In addition, the second speed threshold set to be at least the first speed threshold is exemplified as the speed of "20 km/h", or the like. According to the present invention, in a case of the speed-correlation amount of the vehicle whereby it may be determined that the vehicle stability is stable becoming no more than the first speed threshold, the both side wheel drive state is maintained or switching to the independent one side wheel drive state is inhibited, until becoming at least the second speed threshold that is set to be at least the first speed threshold. Therefore, in a case of the speed-correlation amount of the vehicle in the both side wheel drive state becoming no more than the first speed threshold, since the precision of the switching judgment is raised by adding a switching condition from the both side wheel drive state to the independent one side wheel drive state, it is possible to further secure vehicle stability.

It is favorable for the control device to further include a slip-correlation-amount acquisition means (e.g., the first judgment unit 61 described later) for acquiring a slip-correlation amount (e.g., the integrated slip point described later) correlated with excessive slip occurring in the vehicle, and the drive state switching means, in a case of the speed correlation amount of the vehicle becoming no more than the first speed threshold in the both side wheel drive state, to maintain the both side wheel drive state or inhibit switching to the independent one side wheel drive state, until becoming at least the second speed threshold set to be at least the first speed threshold, and the slip-correlation amount acquired by the slip-correlation-amount acquisition means becomes no more than a slip threshold (e.g., the excessive slip threshold B described later) in the both side wheel drive state.

In the present invention, the drive-state switching means, in the case of the speed-correlation amount of the vehicle becoming no more than the first speed threshold in the both side wheel drive state, maintains the both side wheel drive state or inhibits switching to the independent one side wheel drive state, until becoming at least the second speed threshold set to be at least the first speed threshold, and the slip-correlation amount acquired by the slips-correlation-amount acquisition means in the both side wheel drive state becomes no more than the slip threshold.

Herein, the control device may determine that the vehicle stability is stable irrespective of excessive slip occurring in the vehicle, etc., when speed-correlation amount of the vehicle declines. In other words, the slip-correlation-amount acquisition means may cause the slip-correlation amount to decline when the speed-correlation amount of the vehicle declines, whereby the control device may determine that the vehicle stability is stable. It should be noted that the first speed threshold whereby it may be determined that the vehicle stability is stable irrespective of excessive slip occurring in the vehicle, etc., by the speed-correlation amount, of the vehicle declining, for example, is exemplified as the speed of "0 km/h" at which the vehicle is stopped, or the like. In addition, the second speed threshold set to be at least, the first speed threshold is exemplified as the speed of "20 km/h", or the like. In addition, for the slip threshold, since the slip-correlation amount declines when the speed-correlation amount of the vehicle declines, it declines more than the threshold when the speed-correlation amount of the vehicle does not decline. According to the present invention, in a case of the speed-correlation amount of the vehicle whereby it may be determined that the vehicle stability is stable becoming no more than the first speed threshold, the both side wheel drive state is maintained or switching to the independent one side wheel drive state is inhibited, until becoming at least the second speed threshold that is set to be at least the first speed threshold, and the slip-correlation amount acquired by the slip-correlation-amount acquisition means in the both side wheel drive state become no more than the slip threshold. Therefore, in a case of the speed-correlation amount of the vehicle in the both side wheel drive state becoming no more than the first speed threshold, since the precision of the switching judgment is raised by adding a switching condition from the both side wheel drive state to the independent one side wheel drive state, it is possible to further secure vehicle stability.

Effects of the Invention

According to the present invention, it is possible to provide a vehicle drive system that can improve driving efficiency while ensuring vehicle stability, by performing switching of drive power distribution of the vehicle at a more appropriate timing.

BRIEF DESCRIPTION OF THE DRAWINGS

FIG. 10 is a table showing the sizes of the wheel acceleration threshold in Step S1105 and the sizes of the counter value threshold in Step S1107 in the stable travel determination subroutine according to the above-mentioned embodiment;

DETAILED DESCRIPTION OF THE INVENTION

Hereinafter, embodiments of the present invention will be explained in detail while referencing the drawings.

Figure 1:
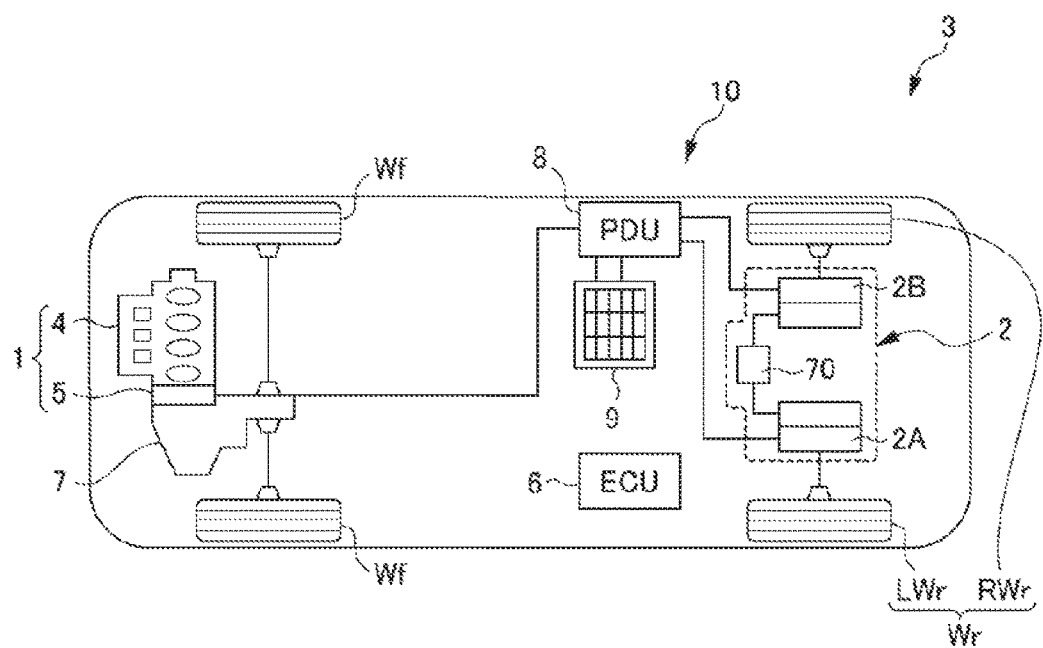
FIG. 1 is a view showing a vehicle equipped with a vehicle drive system according to an embodiment of the present invention.

FIG. 1 is a view showing a vehicle equipped with a vehicle drive system 10 according to the present embodiment. The vehicle 3 equipped with the vehicle drive system 10 according to the present embodiment is a hybrid vehicle. As shown in FIG. 1, the vehicle drive system 10 equipped to the vehicle 3 includes a first drive device 1, a second drive device 2, an electronic control unit (hereinafter referred to as "ECU") 6 serving as a control device that controls these drive devices 1, 2, a PDU (power drive unit) 8, and a battery 9.

The first drive device 1 is provided to a front part of the vehicle 3, and drives the front wheels Wf, Wf serving as first drive wheels. The first drive device 1 has an internal combustion engine (ENG) 4, an electric motor 5, and a transmission 7. The internal combustion engine 4 and electric motor 5 are connected in series, and the torque of this internal combustion engine 4 and electric motor 5 is transmitted to the front wheels Wf, Wf via the transmission 7.

The internal combustion engine 4 is an inline 4-cylinder engine, for example, and generates torque in order to make the hybrid vehicle 3 travel by combusting fuel. The crankshaft of the internal combustion engine 4 is coupled to the output shaft of the electric motor 5.

The electric motor 5 is a three-phase AC motor, for example, and generates torque in order to make the vehicle 3 travel by way of electric power stored in the battery 9. The electric motor 5 is connected to the battery 9 via the PDU 8 equipped with an inverter, and assists the drive power of the internal combustion engine 4.

The transmission 7 converts the torque generated by the internal combustion engine 4 into a revolution speed and torque at a desired gear ratio, and transmits to the front wheels Wf, Wf.

The second drive device 2 is provided to a rear part of the vehicle 3, and drives the rear wheels Wr (RWr, LWr) serving as second drive wheels. The second drive device 2 has electric motors 2A, 2B. The torque of these electric motors 2A, 2B is transmitted to the rear wheels Wr (RWr, LWr).

The electric motors 2A, 2B are 3-phase AC motors, for example, and generate torque in order to make the vehicle 3 travel by way of the electric power stored in the battery 9. In addition, the electric motors 2A, 2B are connected to the battery 9 via the PDU 8 including the inverter, and the electric power supply from the battery 9 and the energy regeneration to the battery 9 are controlled by controls signals front the ECO 6 being inputted to the PDU 8.

It should be noted that a frictional brake not illustrated is provided to each of the four of the front wheels Wf, Wf and rear wheels Wr (RWr, LWr). This frictional brake is configured from a hydraulic disk brake, etc., for example. When the driver depresses the brake pedal, the depressing force is amplified and transmitted to the brake pad via the hydraulic cylinder, etc., and frictional force is produced between the brake disk mounted to each drive wheel and the brake pads, whereby braking of each drive wheel is performed.

The second drive device 2 will be explained further detail. It should be noted that the second drive device 2 is described in detail in Japanese Unexamined Patent Application, Publication No. 2010-235051, which was filed by the present applicants and has been published.

Figure 2:
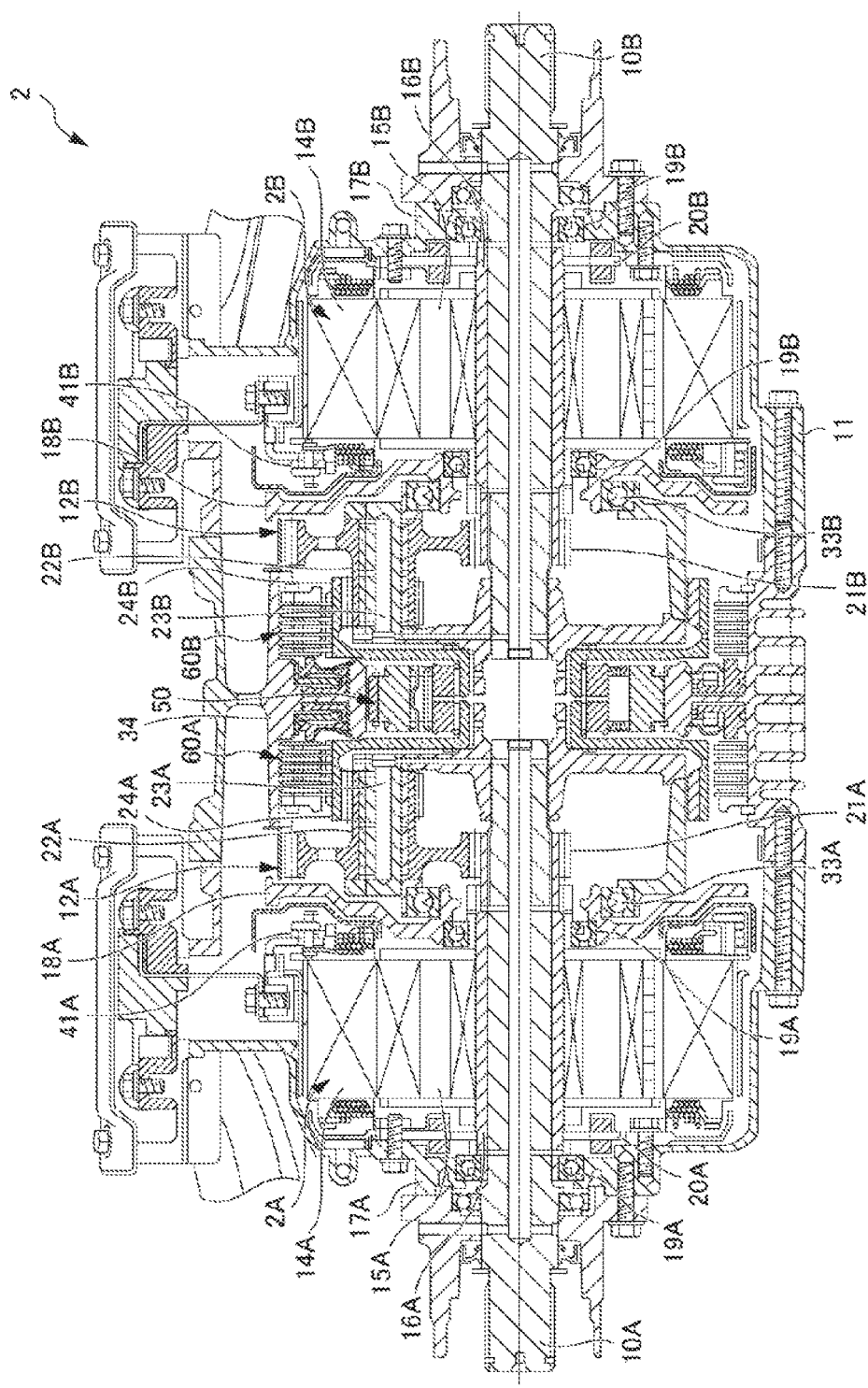
FIG. 2 is a longitudinal profile of a second drive device according to the above-mentioned embodiment.
Figure 3:
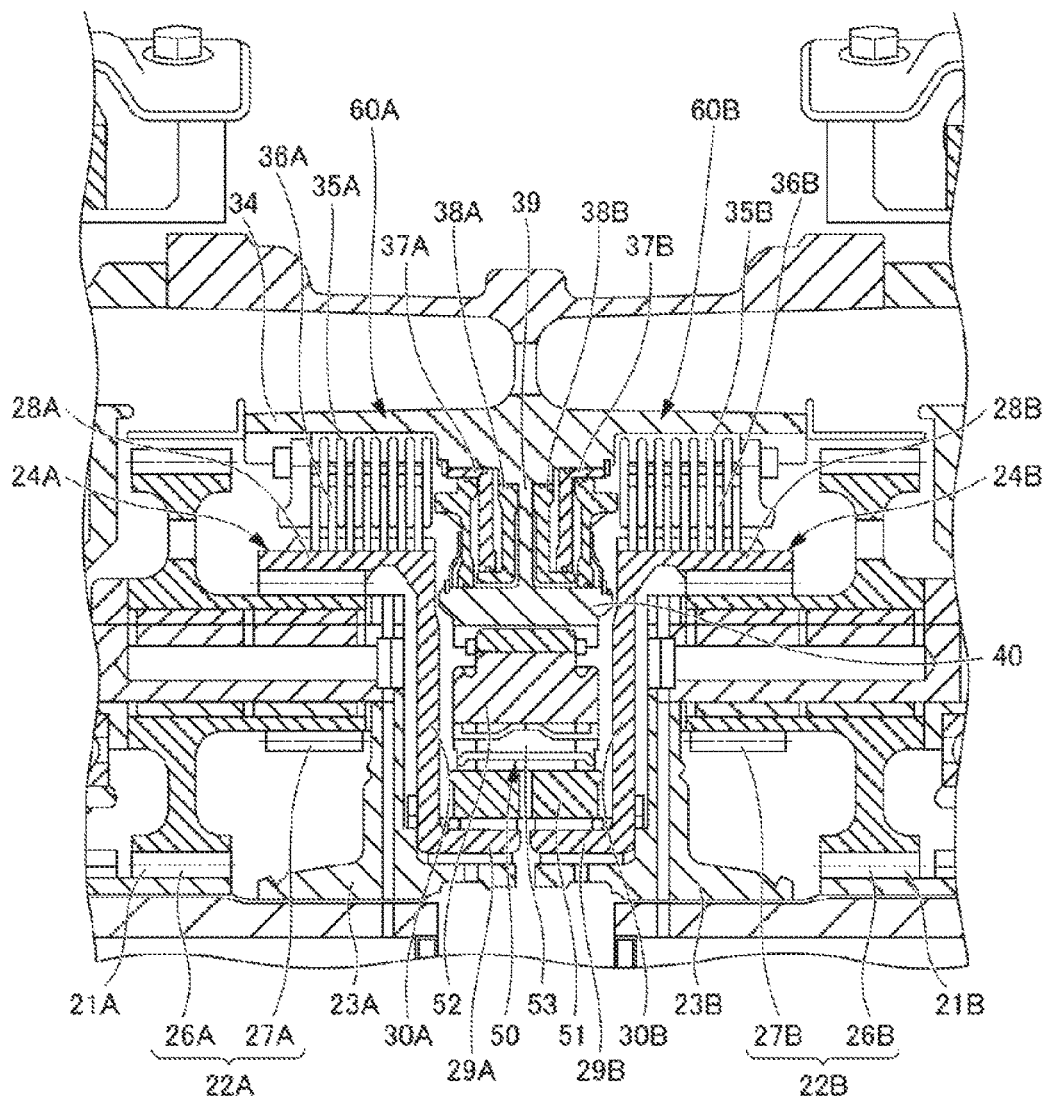
FIG. 3 is a partial enlarged view of the second drive device shown in FIG. 2.

FIG. 2 is a longitudinal section of the second drive device according the present embodiment. FIG. 3 is a partial enlarged view of the second drive device 2 shown in FIG. 2.

As shown in FIGS. 2 and 3, the second drive device 2 has output shafts 10A, 10B that convey drive power to each of the rear wheels RWr, LWr of the vehicle 3, and each is oriented on the same axis in the vehicle width direction. These output shafts 10A, 10B are connected to the axles of the rear wheels RWr, LWr, respectively. The electric motors 2A, 2B driving the output shafts 10A, 10B and planetary gear-type reduction devices 12A, 12B reducing the drive revolution speed of the electric motors 2A, 2B are arranged on the same axis as the output shafts 10A, 10B inside of a gear reduction case 11.

Herein, the gear reduction case 11 has a cylindrical outer-diameter side support part 34 extending in the axial direction with a smaller inner side than an outer wall part. The outer-diameter side support part 34 extends the support wall 39 to an inner circumference side, and is forming the cylindrical support, part 40 at an inner-circumferential leading end of the support wall 39. The gear reduction case 11 is described in detail in Japanese Unexamined Patent-Application, Publication No. 2010-235051, which was filed by the present, applicants and has been published.

Stators 14A, 14B of the electric motors 2A, 2B are fixed to both left and right end side interiors of the gear reduction case 11. Annular rotors 15A, 15B are arranged to be rotatable at an inner circumferential side of the stators 14A, 14B. Cylindrical shafts 16A, 16B enclosing the outer circumference of the output, shafts 10A, 10B are coupled to the inner circumferential part of the rotors 15A, 15B, and these cylindrical shafts 16A, 16B are supported to be relatively rotatable on the same axis as the output shafts 10A, 10B. Resolvers 20A, 20B that, detect rotational position information of the rotors 15A, 15B are provided to the end walls 17A, 17B of the gear reduction case 11.

The planetary gear-type reduction devices 12A, 12B possess sun gears 21A, 21B meshed by cylindrical shafts 16A, 16B; pluralities of planetary gears 22A, 22B meshed by these sun gears 21A, 21B; planetary carriers 23A, 23B supporting these planetary gears 22A, 22B; and ring gears 24A, 24B meshed by the outer circumferential sides of the planetary gears 22A, 22B, in which the drive power of the electric motors 2A, 2B is inputted from the cylindrical shafts 16A, 16B and sun gears 21A, 21B, and the gear-reduced drive power is outputted to the output shafts 10A, 10B from the sun gears 21A, 21B through the planetary carriers 23A, 23B. It should be noted to reference Japanese Unexamined Patent Application, Publication No. 2010-235051 for the details of the planetary gear-type reduction devices 12A, 12B.

Between the outside diameter-side support part 34 of the gear reduction case 11 and the ring gears 24A, 24B, a cylindrical space is maintained, and hydraulic brakes 60A, 60B performing braking on the ring gears 24A, 24B are arranged to overlap in the radial direction with a second pinion 26A, and overlap in the axial direction with a first pinion 27A, inside this space. In the hydraulic brakes 60A, 60B, a plurality of fixed plates 35A, 35B that are spline fitted to the inner circumferential face of the outside diameter-side support part 34 of the gear reduction case 11, and pluralities of rotating plates 36A, 36B that are spline fitted to the outer circumferential face of the ring gears 24A, 24B are alternatingly arranged in the axial direction, and these plates 35A, 35B, 36A, 36B undergo engaging and releasing operations by way of annular pistons 37A, 37B.

The pistons 37A, 37B are housed to be able to advance and retract in annular cylinder chambers 38A, 38B formed between the outside diameter-side support part 34 of the gear reduction case 11, support wall 39 extending to the inner circumferential side thereof, and a cylindrical support part 40 formed at the inner circumferential leading end of the support wall 39, and the pistons 37A, 37B are made to advance by introducing high-pressure oil into the cylinder chambers 38A, 38B, and the pistons 37A, 37B are made to retract by draining the oil from the cylinder chambers 38A, 38B, The hydraulic brakes 60A, 60B are connected to an oil pump.

The hydraulic brakes 60A, 60B fasten the gear reduction case 11 and ring gears 24A, 24B by causing the pistons 37A, 37B to advance, and thus perform braking on the ring gears 24A, 24B. In addition, the hydraulic brakes 60A, 60B release the fastening of the gear reduction case 11 and the ring gears 24A, 24B by causing the pistons 37A, 37B to retract, and do not perform braking on the ring gears 24A, 24B.

It should be noted to reference Japanese Unexamined Patent Application, Publication No. 2010-235051 for the details of the hydraulic brakes 60A, 60B and the pistons 37A, 37B.

The cylindrical space is maintained between the pistons 37A, 37B and the ring gears 24A, 24B, and a one-way clutch 50 that only transmits power in one direction to the ring gears 24A, 24B and isolates power in the other direction is arranged inside this space. The one-way clutch 50 is configured by interposing a plurality of springs 53 between an inner race 51 and an outer face 52, in which this inner race 51 is configured to be integrally rotatable with the gear parts 28A, 28B of the ring gears 24A, 24B. In addition, the outer race 52 is positioned and jammed by the inner circumferential face of the cylindrical support part 40 of the gear reduction case 11.

The one-way clutch 50 is configured so as to lock (engage) rotation of both ring gears 24A, 24B by engaging upon the vehicle 3 traveling forward by the drive power of the electric motors 2A, 2B. More specifically, the one-way clutch 50 is configured so as to lock (engage) and disengage both ring gears 24A, 24B in the acting direction of the torque acting on the ring gears 24A, 24B, and locks (engages) both ring gears 24A, 24B, in the case of torque in the reverse rotation direction acting on the ring gears 24A, 24B, respectively, when defining the rotational direction of the sun gears 21A, 21B upon the vehicle 3 advancing as the normal rotation direction.

In the second drive device 2 configured in this way, the planetary gear-type reduction devices 12A, 12B are opposing in the axial direction at a central part, the ring gear 24A of the planetary gear-type reduction device 12A and the ring gear 24B of the planetary gear-type reduction device 12B are coupled, and the coupled ring gears 24A, 24B are rotatably supported via bearings that are not illustrated to the cylindrical support part 40 of the outside diameter-side support part 34. In addition, the hydraulic brakes 60A, 60B are provided in spaces between the outside diameter-side support part 34 and the ring gears 24A, 24B. The one-way clutch 50 is provided in the space between the pistons 37A, 37B and the ring gears 24A, 24B, respectively. The pistons 37A, 37B operating the hydraulic brakes 60A, 60B are arranged on an outside diameter side of bearings, which is between the hydraulic brakes 60A, 60B and the one-way clutch 50.

Operation during normal travel of the second drive device 2 equipped with the above configuration will be explained.

Figure 4:
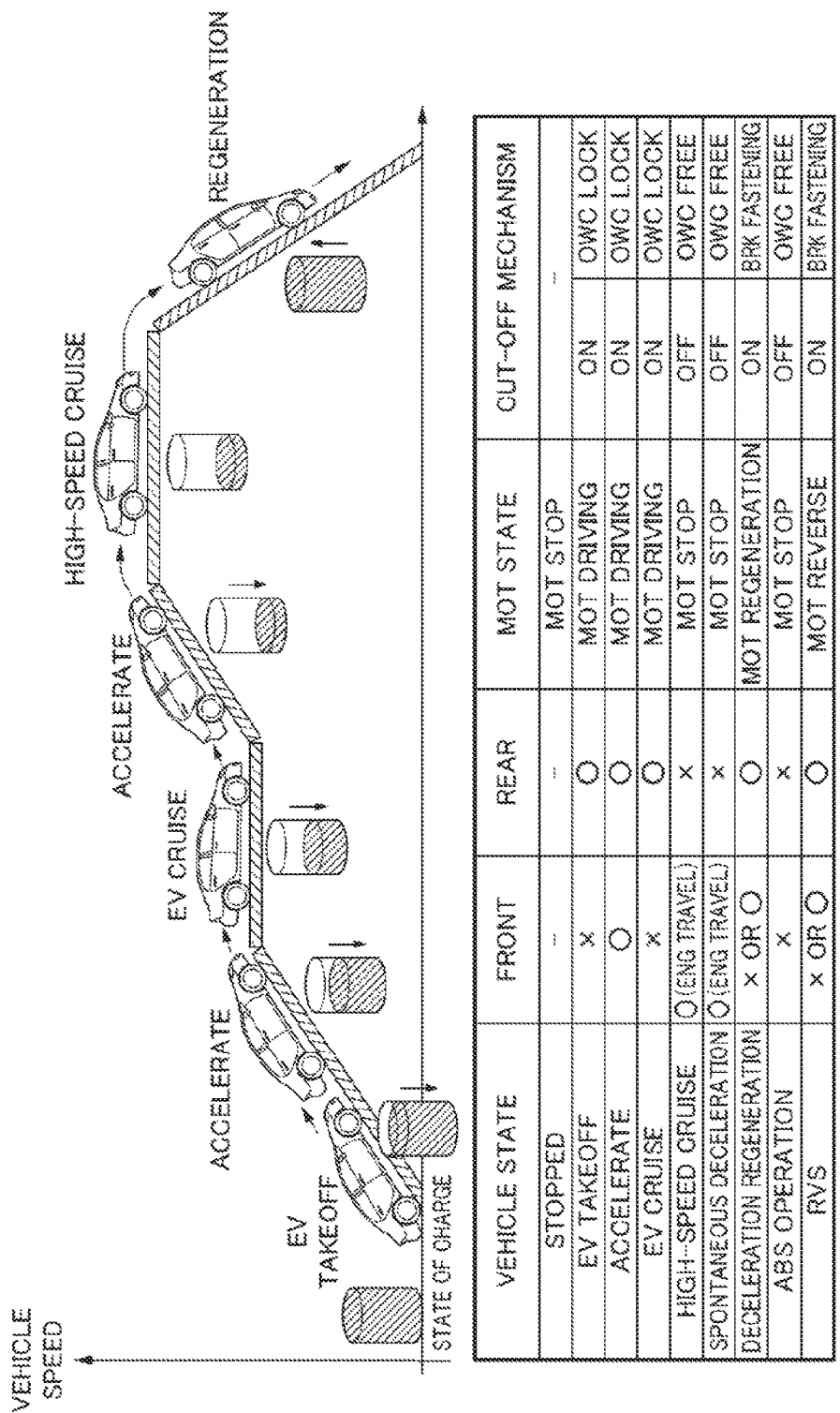
FIG. 4 is a view showing the states of an electric motor and a state of a cut-off mechanism in a traveling state of the vehicle according to the above-mentioned embodiment.

FIG. 4 is a view showing the state of the electric motors 2A, 2B and the states of a cut-off mechanism (one-way clutch 50 and hydraulic brakes 60A, 60B) for the traveling states of the vehicle.

The front in FIG. 4 represents the first drive device 1 driving the front wheels Wf, Wf, and the rear represents the second drive device 2 driving the rear wheels Wr (RWr, LWr), O indicating operational (driving, including regeneration), and X indicating non-operational (stop). In addition, MOT state represents the state of the electric motors 2A, 2B of the second drive device 2. Cut-off mechanism ON indicates both ring gears 24A, 24B being locked (engaged). OFF indicates each of the ring gears 24A, 24B being in a free state. In addition, OWC indicates the one-way clutch 50, and BRK indicates the hydraulic brakes 60A, 60B.

First, while stopped, the first drive device 1 on the front, wheels Wf, Wf side, and the second drive device 2 on the rear wheel Wr (RWr, LWr) side are all stopped; therefore, the electric motors 2A, 2B are stopped, and the cut-off mechanism also enters a non-operational state.

Next, after turning the key position to ON, the electric motors 2A, 2B of the second drive device 2 drive during EY takeoff. At this time, the cut-off mechanism turns ON by the one-way clutch 50, and the power of the electric motors 2A, 2B is transmitted to the rear wheels RWr, LWr.

Next, during acceleration, it enters an both side wheel (four wheel) drive state (AWD) in which both the first drive device 1 and second drive device 2 are driving, and a this time, the cut-off mechanism turns ON by the one-way clutch 50, and the power of the electric motors 2A, 2B is transmitted to the rear wheels RWr, LWr.

At low and medium speed EV cruising, since the motor efficiency is favorable, it enters a rear-wheel independent drive state (RWD) in which the first drive device 1 is in a non-operational state, and only the second drive device 1 drives. At this time as well, the cut-off mechanism turns ON by the one-way clutch 50, and the power of the electric motors 2A, 2B is transmitted to the rear wheels RWr, LWr.

On the other hand, in high-speed cruising at the high-speed region, since the engine efficiency is favorable, it- enters a front-wheel independent drive state (FWD) by the first drive device 1, At this time, the cut-off mechanism turns OFF by the one-way clutch disengaging (OWC free), and the electric motors 2A, 2B stop without the hydraulic brakes 60A, 60B being operated.

In addition, in the case of spontaneous deceleration, the cut-off mechanism turns OFF by the one-way clutch 50 being disengaged (OWD free), and the electric motors 2A, 2B stop without the hydraulic brakes 60A, 60B being operated.

On the other hand, in the case of deceleration regeneration, e.g., in the case of driving by the drive power of the first drive device 1, the one-way clutch 50 of the cut-off mechanism is disengaged to turn OFF (OWC free). However, regenerative charging is done by the electric motors 2A, 2B by the hydraulic brakes 60A, 60B being fastened, and the drive power of the output, shafts 10A, 10B being transmitted to the cylindrical shafts 16A, 16B.

In normal travel, although the traveling energy is absorbed by regenerating with the electric motors 2A, 2B in cooperation with the braking control on the friction brakes, with the demand for urgent braking (e.g., during ABS operation), regeneration of the electric motors 2A, 2B is prohibited, and braking control by the friction brakes is prioritized. In this case, the one-way clutch 50 is disengaged to enter an OFF state (OWC free) in which the electric motors 2A, 2B are made to stop by the hydraulic brakes 60A, 60B not-operating.

In the case of reverse travel, the first drive device 1 stops, and the second drive device drives to be RWD, or both the first drive device 1 and second drive device 2 drive to be AWD. At this time, the electric motors 2A, 2B rotate in the reverse rotation direction, and the one-way clutch 50 of the cut-off mechanism is disengaged and turned OFF (OWC free). However, by the hydraulic brakes 60A, 60B being connected, the drive power of the electric motors 2A, 2B is transmitted to the rear wheels RWr, LWr from the cylindrical shafts 16A, 16B via the output shafts 10A, 10B.

Next, the configuration of the ECU 6 serving as the control device according to the present embodiment will be explained.

The ECU 6 possesses an input circuit having functions such as smoothing input signal waves from various sensors, correcting voltage levels to predetermined levels, and converting analog signal values to digital signal values; and a central arithmetic processing unit (hereinafter referred to as "CPU"). Additionally, the ECU 6 possesses a storage circuit that stores various computational programs executed by the CPU, computational results, etc., and an output circuit that outputs control signals such as to the PDU 8 and internal combustion engine 4.

The ECU 6 consisting of the above such hardware configuration executes drive-state switching control to switch the drive state of the vehicle 3.

Figure 5:
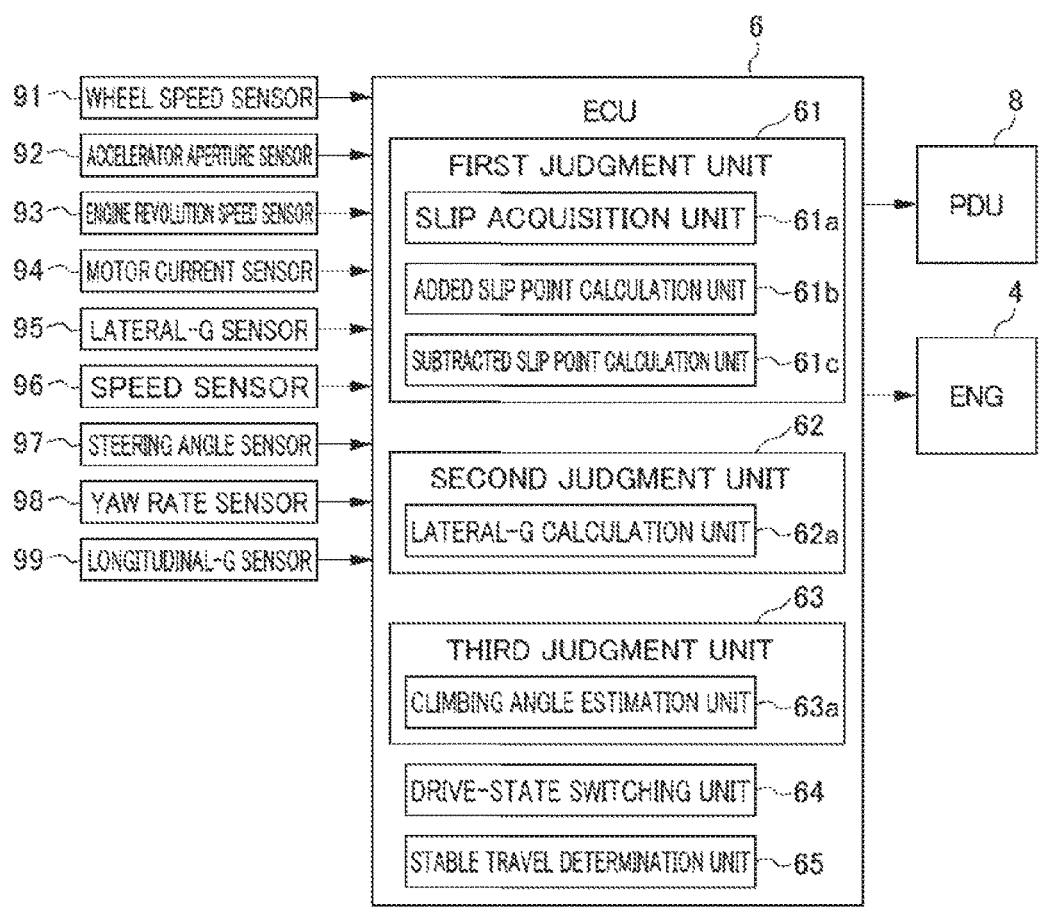
FIG. 5 is a functional block diagram showing the configuration of an ECU according to the above-mentioned embodiment.

FIG. 5 is a functional block diagram showing the configuration of the ECU 6 according to the present embodiment.

As shown in FIG. 5, the detection signals of various sensors such as an accelerator aperture sensor 92, engine revolution speed sensor 93, motor current sensor 95, lateral-G sensor 95, vehicle speed sensor 96, steering-angle sensor 97, yaw-rate sensor 98, and longitudinal-G sensor 99 are inputted to the ECU 6, and the control signals are outputted to the PDU 8 and internal combustion engine 4.

In addition, the ECU 6 is configured to include a first-judgment unit 61, second judgment unit. 62, third judgment unit. 63, drive-state switching unit 64, and stable travel determination unit. 65, as modules for executing drive state switching control. Hereinafter, the functions of each module will be explained.

The first, judgment unit 61 has a slip acquisition section 61a, adjusted slip point calculation section 61b, and integrated slip point calculation section 61c. In addition, the first judgment unit 61 sets a slip AWD demand flag to or "0" by comparing the integrated slip point and an excessive slip threshold.

The slip acquisition unit 61a acquires that excessive slip, which is at least a predetermined slip, occurred at the front wheels Wf, Wf serving as first drive wheels, or the rear wheels Wr (RWr, LWr) serving as second rive wheels. More specifically, the slip acquisition section 61a acquires that excessive slip occurred based on the vehicle wheel speed difference between the front wheels Wf, Wf and the rear wheels Wr (RWr, LWr) detected by the wheel speed sensors 91. The slip acquisition section 61a acquires that excessive slip occurred similarly to during travel, also when the vehicle 3 is stopped.

Herein, the vehicle 3 can also be considered as travelling while always causing slight slip to occur at the drive wheels on a dry road of high p state. For this reason, "excessive slip" in the present embodiment excludes such slight slip.

The adjusted slip point, calculation section 61b calculates the adjusted slip point, which is an added slip point or subtracted slip point, in a time discrete manner, based on the slip acquisition section 61a having acquired or not having acquired that excessive slip occurred. In other words, the adjusted slip point calculation section 61b calculates an added slip point based on the slip acquisition section 61a having acquired that excessive slip occurred. In addition, it calculates a subtracted slip point based on the slip acquisition section 61a not having acquired that excessive slip occurred.

Figure 6:
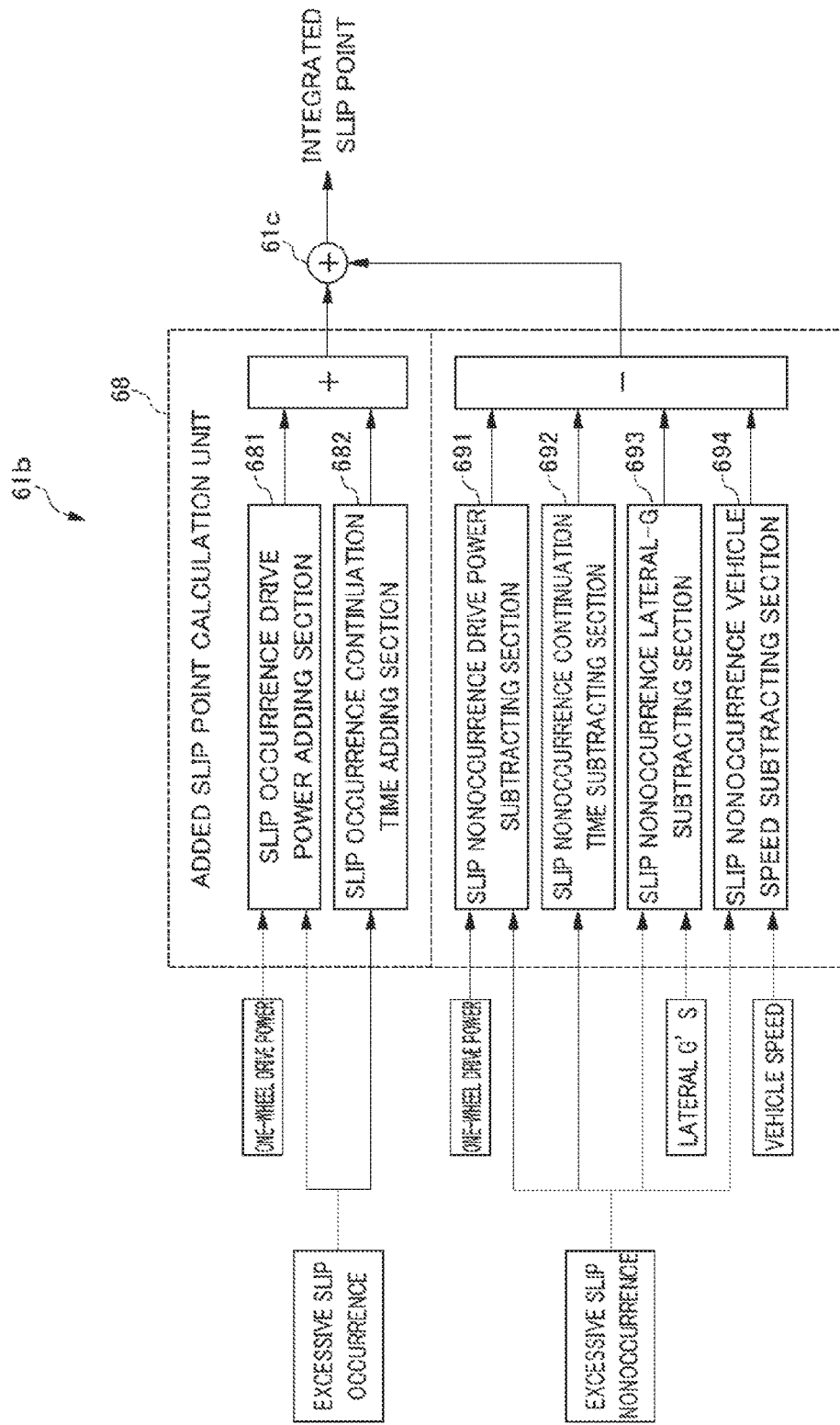
FIG. 6 is a functional block diagram showing the configuration of an adjusted slip point calculation unit according to the above-mentioned embodiment.

FIG. 6 is a functional block diagram showing the configuration of the adjusted slip point calculation section 61b according to the present embodiment.

As shown in FIG. 6, the adjusted slip point calculation section 61b calculates an adjusted slip point, based on the drive power correlation value correlated with the drive power of the drive wheel at which excessive slip occurs, when the slip acquisition section 61a acquired that excessive slip occurred.

Herein, as the drive power correlation value, for example, although the wheel (one wheel) drive power, wheel (one wheel) torque, the drive power of the first drive device 1 and second drive device 2 driving the wheels, the torque of the first drive device 1 and second drive device 2 driving the wheels are exemplified, it will be explained hereinafter giving an example of the wheel (one wheel) drive power.

More specifically, the adjusted slip point calculation section 61b is configured from the added slip point calculation part 68 and subtracted slip point calculation part 69, as shown in FIG. 6. The adjusted slip point calculation section 61b, when the slip acquisition section 61a acquires that excessive slip occurred, calculates the added slip point of a plus value by way of the added slip point calculation part 68, and sends the added slip point, thus calculated to the integrated slip point calculation section 61c.

In addition, the adjusted slip point calculation section 61b, when the slip acquisition section 61a has not acquired that excessive slip occurred, calculates subtracted a slip point, of a minus value by way of the subtracted slip point calculation part 69, and sends the subtracted slip point thus calculated to the integrated slip point calculation section 61c.

The added slip point calculation part 68 includes a slip occurrence drive power adding part 681, and a slip occurrence continuation time adding part 682. The added slip point, calculation part 68 calculates the added slip point, by summing each added slip point of a plus value calculated by each of these adding parts.

The slip occurrence drive power adding part 681 calculates a drive power added slip point as an added slip point, by searching a drive power added slip point calculation table created and stored in advance, according to the one wheel drive power (N) during excessive slip occurrence. The slip occurrence drive power adding part 681 calculates a larger drive power added slip point with the one side wheel drive power during excessive slip occurrence being lower drive power, in a range not exceeding an excessive slip threshold.

Herein, one wheel drive power (N) in the present specification indicates the largest drive power among the drive powers of each of the four wheels of the vehicle 3, The one wheel drive power, other than being detected by a sensor, for example, is estimated and acquired based on the accelerator aperture detected by the accelerator aperture sensor 92, the engine revolution speed detected by the engine revolution speed sensor 93, the respective motor currents detected by the motor current sensors 94 provided to each of the electric motors 5, 2A and 2B, etc.

In addition, the excessive slip threshold is set in advance to an appropriate value as an indicator for switching the drive state of the vehicle 3 to AMD and excessive slip front/rear distribution setting, when setting the slip AWD demand flag to "1" or "0" via the first judgment unit 61.

The slip occurrence continuation time adding section 682 calculates the time added slip point as an added slip point, by searching a time added slip point calculation table created and stored in advance, according to the slip occurrence continuation time (seconds), i.e. the continuation time for which the slip acquisition section 61a has acquired that excessive slip has occurred. The slip occurrence continuation time adding section 682 calculates a larger time added slip point as the excessive slip occurrence continuation time lengthens until the integral value of the time added slip point exceeds the above-mentioned excessive slip threshold, and after the integral value exceeds the excessive slip threshold, continually calculates the time added slip point of almost 0.

In addition, as shown in FIG. 6, the subtracted slip point calculation unit 69 has a slip nonoccurrence time drive power subtraction section 691, slip nonoccurrence continuation time subtraction section 692, slip nonoccurrence time lateral-G subtraction section 693, and slip nonoccurrence time vehicle-speed subtraction section 694. The subtracted slip point calculation unit 69 calculates the subtracted slip point by summing the respective subtracted slip points of minus values calculated by each of these subtraction sections.

The slip nonoccurrence time drive power subtraction section 691 calculates the drive power subtracted slip point as the subtracted slip point, by searching a drive power subtracted slip point calculation table created and stored in advance, according to the one wheel drive power (N) during excessive slip nonoccurrence. The slip nonoccurrence time drive power subtraction section 691 calculates the drive power subtracted slip point as 0 when the one wheel drive power during excessive slip nonoccurrence is less than a predetermined value, and calculates a constant drive power-subtracted slip point having a comparatively larger absolute value when at least the predetermined value.

The slip nonoccurrence continuation time subtraction section 692 calculates the time subtracted slip point as the subtracted slip point, by searching a time subtracted slip point calculation table created and stored in advance, according to the excessive slip nonoccurrence continuation time, i.e. the continuation time for which the slip acquisition unit 61a has not acquired that excessive slip occurred. The slip nonoccurrence continuation time subtraction section 692 calculates a constant time subtracted slip point having a comparatively small absolute value, irrespective of the excessive slip nonoccurrence continuation time.

The slip nonoccurrence time lateral-G subtraction section 693 calculates a lateral-G slip point as the subtracted slip point, by searching a lateral-G subtracted slip point calculation table created and stored in advance, according to the lateral G's detected by the lateral-G sensor 95 during excessive slip nonoccurrence. The slip nonoccurrence time lateral-G subtraction section 693 calculates the lateral-G subtracted slip point, as 0 when the lateral G's during excessive slip nonoccurrence is less than a predetermined value, and calculates a constant lateral-G subtracted slip point having a comparatively large absolute value when at least the predetermined value.

The slip nonoccurrence time vehicle-speed subtraction section 694 calculates the vehicle speed subtracted slip point as the subtracted slip point, by searching a vehicle speed subtracted slip point calculation table created and stored in advance, according to the vehicle speed detected by the vehicle speed sensor 96 during excessive slip nonoccurrence. The slip nonoccurrence time vehicle-speed subtraction section 694 calculates a constant vehicle speed subtracted slip point having a comparatively large absolute value when the vehicle speed during excessive slip nonoccurrence is less than a predetermined value, and calculates the vehicle speed subtracted slip point as 0 when at least the predetermined value.

The integrated slip point calculation section 61c chronologically calculates the integrated slip point, by integrating the added slip point calculated by the added slip point, calculation unit 68, and the subtracted slip point calculated by the subtracted slip point, calculation unit 69.

The second judgment unit 62 has a lateral-G calculation section 62a. In addition, the second judgment unit 62 sets the "lateral-G" AWD demand flag to "1" or "0" by comparing between the calculated "lateral-G" and a lateral-G threshold.

The lateral-G calculation section 62a calculates that lateral G's (lateral acceleration) have generated in the vehicle 3. More specifically, the lateral-G calculation section 62a detects lateral G's by the lateral-G sensor 95.

Alternatively, the lateral-G calculation section 62a calculates the lateral G's according to the following formula, as disclosed in Japanese Unexamined Patent Application, Publication No. 2013-209048.

$$\text{Lateral } G=(V^2 \times \sigma)/(1+A+V^2)/L \qquad \text{formula (1)}$$

Herein, in formula (1), V is the vehicle speed detected by the vehicle speed sensor 96, σ is the tire steering angle detected by the steering angle sensor 97, A is a stability factor, and L is the wheel base.

Similarly, the lateral-G calculation section 62a calculates the lateral G's according to the following formula, as disclosed in Japanese Unexamined Patent Application, Publication No. 2013-209048.

$$\text{Lateral } G=Yr \times V \qquad \text{formula (2)}$$

Herein, in formula (2), Yr is the yaw rate detected by the yaw-rate sensor 98, and V is the vehicle speed detected by the vehicle speed sensor 96.

The third judgment unit 63 has a climbing angle estimation section 63a. In addition, the third judgment unit 63 sets the climbing AWD demand flag to "1" or "0" by comparing between the estimated climbing angle and the climbing angle threshold.

The climbing angle estimation section 63a estimates that the traveling direction climbing angle that is the difference between the travel direction wheels and the opposite side wheels of the vehicle 3 increasing as becoming an upward slope was occurred. More specifically, the climbing angle estimation section 63a estimates the climbing angle by the longitudinal-G sensors 99, which are G sensors arranged to be separated at the front and back of the vehicle 3.

The drive-state switching unit 64 changes the drive power distribution and switches from 2WD, which drives the vehicle 3 by only either one among the front wheels Wf, Wf serving as first drive wheels, or rear wheels Wr (RWr, LWr) serving as second drive wheels, to AWD, which drives the vehicle 3 by both the front wheels Wf, Wf serving as first drive wheels, and rear wheels Wr (RWr, LWr) serving as second drive wheels, based on the switching judgment of the first judgment unit 61, switching judgment of the second judgment unit 62 and switching judgment of the third judgment unit 63.

Herein, as the one side wheel independent drive state, there are FWD, which drives the vehicle 3 by only the front wheels Wf, Wf, and RWD, which drives the vehicle 3 by only the rear wheels Wr (RWr, LWr).

In other words, the drive-state switching unit 64 executes switching of the drive power distribution in AWD switched from FWD or RWD, Alternatively, the drive-state switching unit 64 executes switching of the drive power distribution in a state maintaining AWD.

More specifically, the drive-state switching unit 64 switches the drive state of the vehicle 3 to AWD and excessive slip front/rear distribution setting, when the slip AWD demand flag is set to "1" via the first judgment unit 61.

Herein, the drive-state switching unit 64 switches the drive state of the vehicle 3 to AWD and excessive slip front/rear distribution setting, when the slip AWD demand flag is set to "1" via the first judgment unit 61, even in a state of the "lateral-G" AWD demand flag being set to "1" via the second judgment unit 62 and having switched the drive state of the vehicle 3 to AWD and lateral-G front/rear distribution setting.

In addition, the drive-state switching unit 64 switches the drive state of the vehicle 3 to AWD and lateral-G front/rear distribution setting, when the "lateral-G" AWD demand flag is set to "1" via the second judgment unit 62.

In addition, the drive-state switching unit 64 switches the drive state of the vehicle 3 to AWD and climbing front/rear distribution setting, when the climbing AWD demand flag is set to "1" via the third judgment unit 63.

Herein, front/rear distribution setting indicates a distribution ratio of drive power (N) between the travel direction wheels and the opposite side wheels thereto of the vehicle 3. The drive power (N), other than being detected by a sensor, for example, is estimated and acquired based on the accelerator aperture detected by the accelerator aperture sensor 92, the engine revolution speed detected by the engine revolution speed sensor 93, the respective motor currents detected by the motor current, sensors 94 provided to each of the electric motors 5, 2A and 2B, etc.

The drive-state switching unit 64 switches from AWD, which drives the vehicle 3 by both the front wheels Wf, Wf serving as first, drive wheels, and the rear wheels Wr (RWr, LWr) serving as second drive wheels, to 2WD, which drives the vehicle 3 by only either one of the front wheels Wf, Wf serving as first drive wheels, or rear wheels Wr (RWr, LWr) serving as second drive wheels, based on the switching judgment of the first judgment unit 61, switching judgment of the second judgment unit. 62 and switching judgment of the third judgment unit 63.

Herein, the drive-state switching unit 64 causes the switching processing to differ according to various flags which are switched from previously 2WD to AWD, when switching from AWD to 2WD.

More specifically, after the slip AWD demand flag is set to "1" via the first judgment, unit 61, and the drive state of the vehicle 3 is switched to AWD and excessive slip front/rear distribution setting, the slip AWD demand flag is set to "0" upon the first switching condition being established via the first judgment unit 61, and the drive-state switching unit 64 switches the drive state of the vehicle 3 from AWD and excessive slip front/rear distribution setting to 2WD. In addition, when the first switching condition has been established, the "lateral-G" AWD demand flag is also set to "0".

In addition, after the "lateral-G" AWD demand flag is set to "1" via the second judgment unit 62, and switching the drive state of the vehicle 3 to AWD and lateral-G front/rear distribution setting, only the "lateral-G" AWD demand flag is set to "0" upon the second switching condition being established via the second judgment unit 62, and the drive-state switching unit 64 switches the drive state of the vehicle 3 from the AWD and lateral-G front/rear distribution setting to 2WD.

In addition, after the climbing AWD demand flag is set to "1" via the third judgment unit 63, and the drive state of the vehicle 3 is switched to AWD and climbing front/rear distribution setting, the climbing AWD demand flag is set to "0" upon the third switching condition being established via the third judgment unit 63, and the drive-state switching unit 64 switches the drive state of the vehicle 3 to the AWD and climbing front/rear distribution setting.

The stable travel determination unit 65 determines whether or not the vehicle 3 is stably traveling. More specifically, in the case of the slip AWD demand flag, "lateral-G" AWD demand flag or climbing AWD demand flag being "1", it is determined whether or not the vehicle 3 is stably traveling based on the detected values of the steering angle sensor 97, yaw-rate sensor 98, vehicle speed sensor 96, wheel speed sensors 91, etc. and estimated values arrived at using these detected values. The stable travel determination unit 65 determines that the vehicle 3 is stably traveling by executing a stable travel determination subroutine. The stable travel determination unit 65 sets the stable travel determination flag to "1" when determining that the vehicle 3 is stably traveling, and sets the stable travel determination flag to "0" when determining that the vehicle 3 is not stably traveling. It should be noted that the stable travel determination flag is a permission determination flag for changing the setting of the slip AWD demand flag and "lateral-G" AWD demand flag, and is not a flag that prioritizes itself over other flags to be forcibly set when the vehicle 3 is stably traveling.

Next, the drive-state switching control executed by the ECU 6 according to the present embodiment will be explained.

Figure 7:
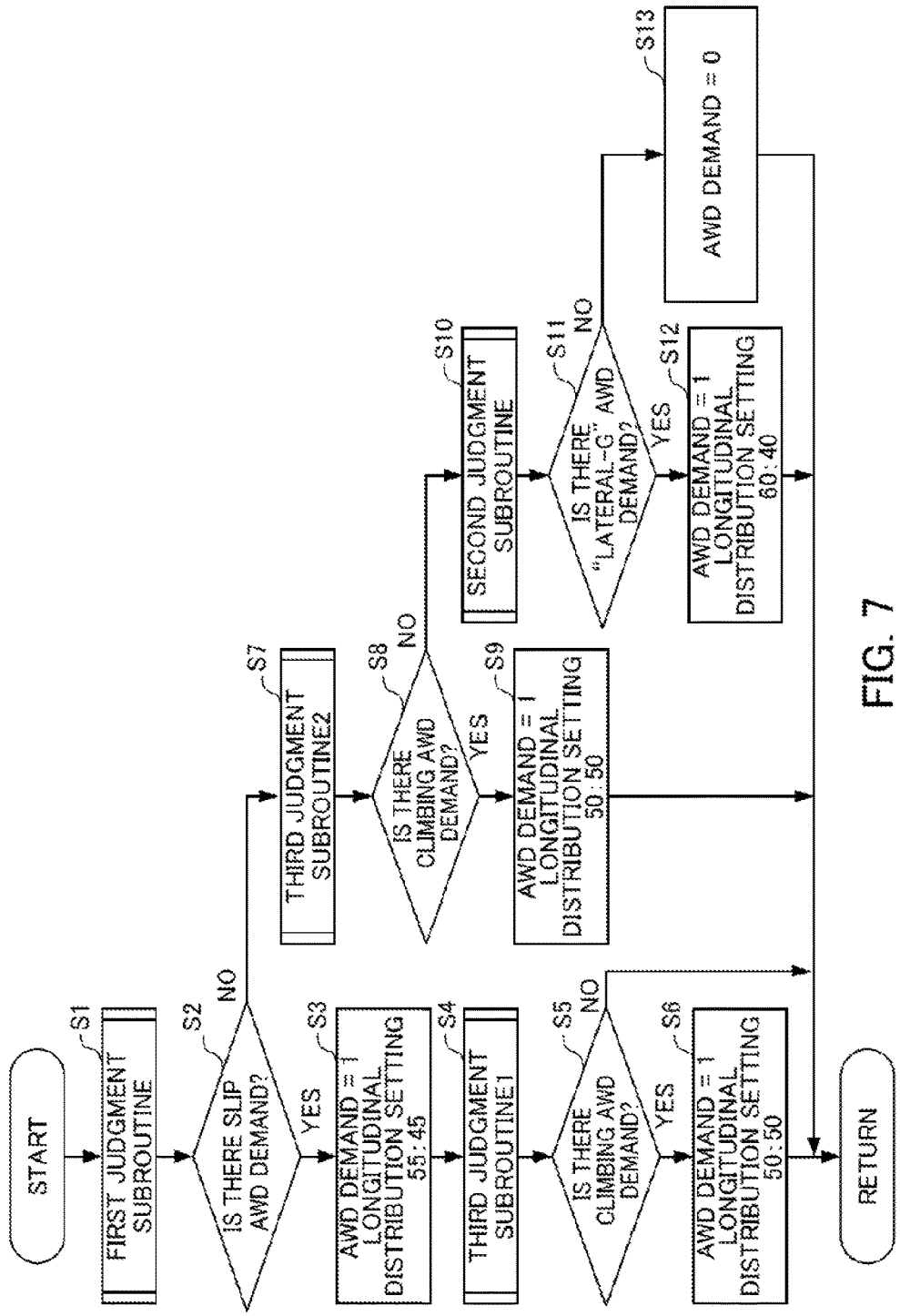
FIG. 7 is a flowchart showing a sequence of a drive-state switching control routine according to the above-mentioned embodiment.

FIG. 7 is a flowchart showing the sequence of a drive-state switching control routine according to the present embodiment. This control processing routing is repeatedly executed by the ECU 6.

In Step S1, the ECU 6 executes a first judgment subroutine. The first judgment subroutine sets the slip AWD demand flag to "1" or "0".

Figure 8:
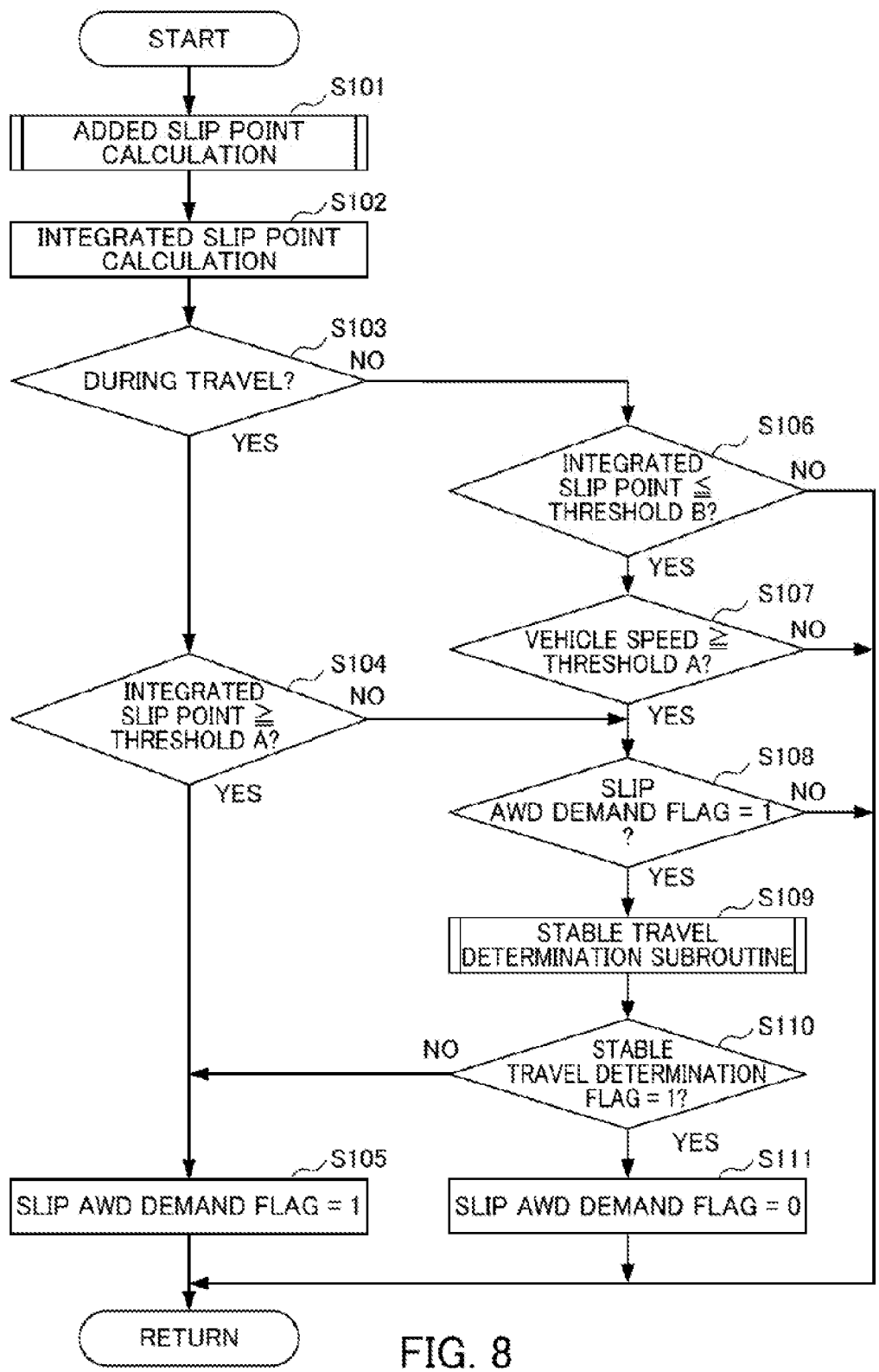
FIG. 8 is a flowchart showing the sequence of a first judgment subroutine according to the above-mentioned embodiment.

FIG. 8 is a flowchart showing the sequence of first judgment subroutine according to the present embodiment.

In Step S101, the ECU 6 calculates the adjusted slip point by way of the adjusted slip point calculation section 61b. More specifically, the ECU 6 executes processing to sum the respective added slip points calculated, after calculating each added slip point according to the drive power added slip point calculation processing and time added slip point calculation processing. In addition, similarly, after calculating each of the subtracted slip points according to the drive power subtracted slip point calculation processing, time subtracted slip point calculation processing, lateral-G subtracted slip point calculation processing and vehicle speed subtracted slip point calculation processing, processing to sum the respective subtracted slip points calculated is executed.

In Step S102, the ECU 6 integrates the added slip point or subtracted slip point calculated in Step S101 with the previous value of the integrated slip point by the integrated slip point calculation section 61c, thereby calculating the integrated slip point. Subsequently, the processing advances to Step S103.

In Step S103, the ECU 6 determines whether the vehicle 3 is in travel. In the case of this determination being YES, the processing advances to Step S104 due to being FWD or RWD. In the case of being NO, the processing advances to Step S106 due to the vehicle 3 being stopped even if the internal combustion engine 4 is during engine operation, and the wheel speed difference between the front wheels Wf, Wf and the rear wheels Wr (RWr, LWr) not being detected by the wheel speed sensors 91.

In Step S104, the ECU 6 determines whether the integrated slip point calculated in Step S102 is at least an excessive slip threshold A. The excessive slip threshold A is set in advance to an appropriate value as an index for switching the drive state of the vehicle 3 to the AWD and excessive slip front/rear distribution setting, when setting the slip AWD demand flag to "1" via the first judgment unit 61. In the case of this determination being YES, the processing advances to Step S105. In the case of being NO, the processing advances to Step S108.

In Step S105, the ECU 6 sets the slip AWD demand flag to "1", and ends the first judgment subroutine. Switching to the AWD and excessive slip front/rear distribution setting is thereby executed.

In Step S106 after determining the vehicle 3 being while stopped, the ECU 6 determines whether the integrated slip point, calculated in Step S102 is no more than an excessive slip threshold B. The excessive slip threshold B is set in advance to an appropriate value as an index for switching the drive state of the vehicle 3 from the AWD and excessive slip front/rear distribution setting, when the slip AWD demand flag is set to "0" via the first judgment unit 61. The excessive slip threshold B is set to a value falling below the excessive slip threshold A of Step S104, due to the integrated slip point, calculated in Step S102 declining by the subtracted excessive slip point being added while stopped. In the case of this determination being YES, the processing advances to Step S107. In the case of being NO, the first judgment subroutine is ended. When ending the first, judgment subroutine in this step, various flags maintain the previous setting.

In Step S107, the ECU 6 determines whether or not the vehicle speed detected by the vehicle speed sensor 96 is at least a vehicle speed threshold A. The vehicle speed threshold A is set in advance to an appropriate value as an indicator for switching the drive state of the vehicle 3 from the AWD and excessive slip front/rear distribution state, when setting the slip AWD demand flag to "0" via the first judgment unit 61. For example, the vehicle speed threshold A is set to 20 cm/h or the like at which leaving the stopped state is reliably understood. In the case of this determination being YES, the processing advances to Step S108. In the case of being MO, the first judgment subroutine is ended. When ending the first judgment subroutine in this step, various flags maintain the previous setting.

Herein, the ECU 6 may determine that the vehicle stability is stable irrespective of excessive slip occurring in the vehicle 3, when the vehicle 3 is stopped. In other words, the integrated slip point calculation section 61c causes the integrated slip point to decline when the vehicle 3 is stopped, whereby the ECU 6 may determine as the vehicle stability being stable.

According to the present embodiment, by the first judgment subroutine including Steps S106 and S107, when the vehicle 3 which may be determined as the vehicle stability being stable, AWD is maintained (or switching to 2WD is inhibited) until reaching at least the vehicle speed threshold A and the integrated slip point, acquired by the integrated slip point calculation section 61c becomes no more than the excessive slip threshold B, Therefore, when the vehicle 3 is stopped in AWD in which the slip AWD demand flag is set to "1", since the precision of the switching judgment is raised by adding a switching condition from AWD to 2WD, it is possible to further secure vehicle stability.

In Step S108, the ECU 6 determines whether the slip AWD demand flag is "1". In the case of this determination being YES, the processing advances to Step S109. In the case of being NO, the first judgment subroutine is ended. When ending the first judgment subroutine in this step, although the slip AWD demand flag is "0", other flags maintain the previous setting.

In Step S109, the ECU 6 determines whether the vehicle 3 is stably traveling according to a stable travel determination subroutine 1 of the stable travel determination unit 65. The stable travel determination flag is set to "1" when determined as the vehicle 3 stably traveling, and the stable travel determination flag is set to "0" when determined as not stably traveling.

Figure 9:
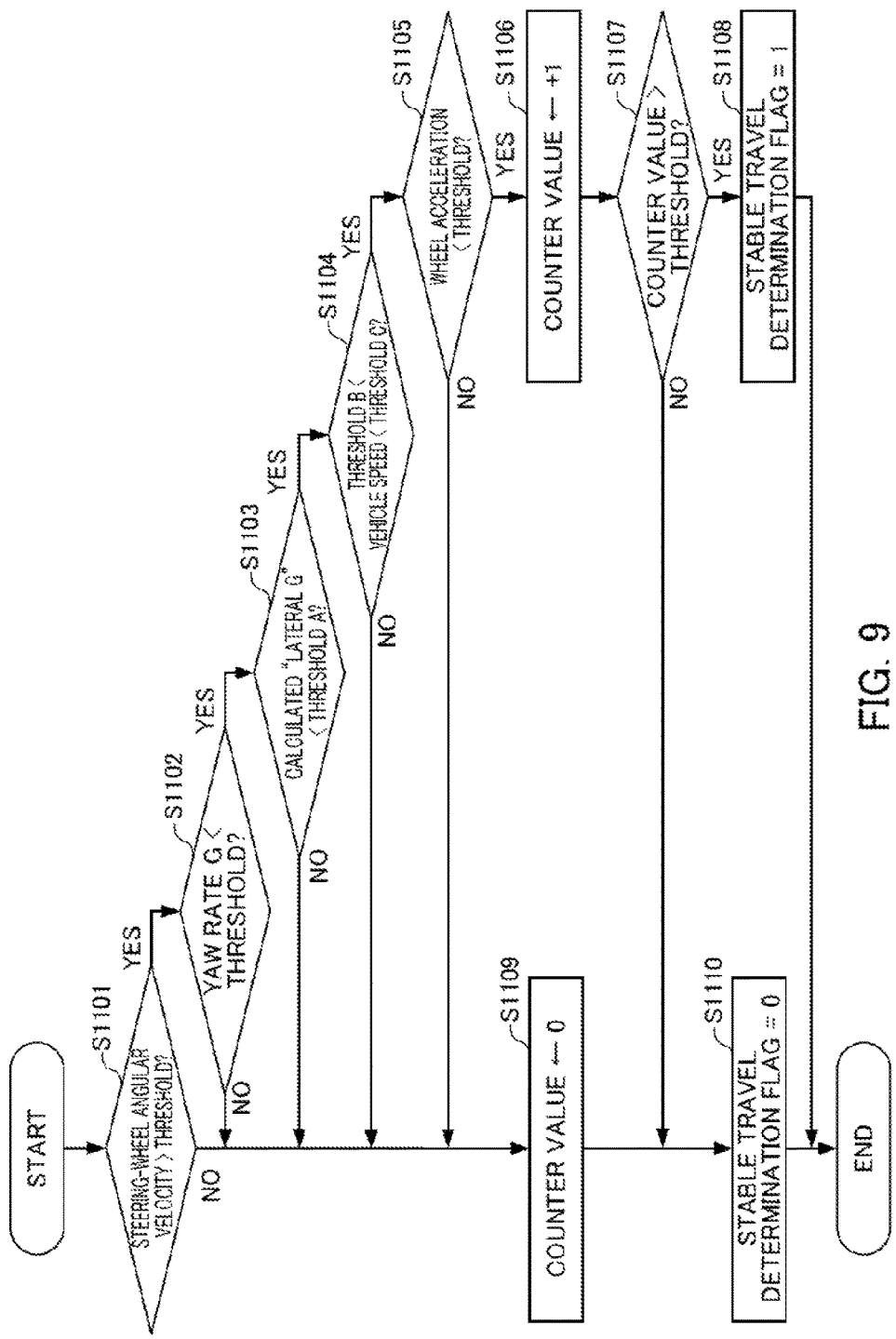
FIG. 9 is a flowchart showing the sequence of a stable travel determination subroutine according to the above-mentioned embodiment.

FIG. 9 is a flowchart showing the sequence of the stable travel determination subroutine 1 according to the present embodiment.

In Step S1101, the ECU 6 determines whether the steering wheel angular velocity calculated by time differentiating the steering wheel angle by the steering angle sensor 97 is less than a steering-wheel angular velocity threshold. The steering-wheel angular velocity threshold is set in advance to an appropriate value as an indicator for setting the stable travel determination flag to via the stable travel determination unit 65. In the case of this determination being YES, the processing advances to Step S1102. In the case of being NO, the processing advances to Step S1109, the counter value is reset to "0", the processing advances to Step S1110, and after setting the stable travel determination flag to "0", the stable travel determination subroutine is ended.

In Step S1102, the ECU 6 determines whether the yaw-rate G's calculated by multiplying the yaw rate detected by the yaw-rate sensor 98 and the vehicle speed detected by the vehicle speed sensor 96 is less than a yaw-rate G threshold. The yaw-rate G threshold is set in advance to an appropriate value as an indicator for setting the stable travel determination flag to "1" via the stable travel determination unit 65. In the case of this determination being YES, the processing advances to Step S1103. In the case of being NO, the processing advances to Step S1109, the counter value is reset to "0", the processing advances to Step S1110, and after setting the stable travel determination flag to "0", the stable travel determination subroutine is ended.

In Step S1103, the ECU 6 determines whether the calculated "lateral G" is less than a lateral-G threshold A. The calculated "lateral G" is calculated based on the detection value of the lateral-G sensor 95, etc. The lateral-G threshold A is set in advance to an appropriate value, as an indicator for setting the stable travel determination flag to "1" via the stable travel determination unit 65. In the case of this determination being YES, the processing advances to Step S1104, In the case of being NO, the processing advances to Step S1109, the counter value is reset to "0", the processing advance to Step S1110, and after setting the stable travel determination flag to "0", the stable travel determination subroutine is ended.

In Step S1104, the ECU 6 determines whether the vehicle speed detected by the vehicle speed sensor 96 is larger than a vehicle speed threshold B and smaller than a vehicle speed threshold C. The vehicle speed thresholds B and C are set in advance to appropriate values as indicators for setting the stable travel determination flag to "1" via the stable travel determination unit 65. In the case of this determination being YES, the processing advances to Step S1105. In the case of being NO, the processing advances to Step S1109, the counter value is reset to "0", the processing advances to Step S1110, and after setting the stable travel determination flag to "0", the stable travel determination subroutine is ended.

In Step S1105, the ECU 6 determines whether the wheel acceleration calculated by time differentiating the wheel speed detected by the wheel speed sensors 91 is less than a wheel acceleration threshold. The wheel acceleration threshold is set in advance to an appropriate value as an indicator for setting the stable travel determination flag to "1" via the stable travel determination unit 65. In the case of this determination being YES, the processing advances to Step S1106. In the case of being NO, the processing advances to Step S1109, the counter value is reset to "0", the processing advances to Step S1110, and after setting the stable travel determination flag to "0", the stable travel determination subroutine is ended.

It should be noted that, as shown in FIG. 10, the wheel acceleration threshold in Step S1105 in the stable travel determination subroutine of Step S109 in the first judgment subroutine of Step S1 is smaller than the wheel acceleration threshold of Step S1105 in the stable travel determination subroutine of Step S306 in the second judgment subroutine of Step S10 described later. This threshold constitutes a first switching condition. The reason thereof is as follows. The stable travel determination subroutine of Step S109 in the first judgment subroutine of Step S1 is used in the case of being AWD in which the slip AWD demand flag is set to "1", and the vehicle stability during travel growing worse than AWD in which the "lateral-G" AWD demand flag is set to "1". For this reason, the switching condition from AWD to 2WD is enhanced by lessening the wheel acceleration threshold, whereby it is made difficult to switch from AWD to 2D, and the vehicle stability is further secured.

In Step S1106, the ECU 6 increments (+1) the counter value.

In Step S1107, the ECU 6 determines whether or not the counter value is greater than a counter value threshold. The counter value threshold is set in advance to an appropriate value as an indicator for setting the stable travel determination flag to "1" via the stable travel determination unit 65. In the case of this determination being YES, the processing advances to Step S1108, and after setting the stable travel determination flag to "1", the stable travel determination subroutine is ended. In the case of being NO, the processing advances to Step S1110, and after setting the stable travel determination flag to "0", the stable travel determination subroutine is ended.

It should be noted that, as shown in FIG. 10, the counter value threshold of Step S1107 in the stable travel determination subroutine of Step S109 in the first judgment subroutine of Step S1 is larger than the counter value threshold of Step S1107 in the stable travel determination subroutine of Step S306 in the second judgment subroutine of Step S10 described later. This threshold constitutes a first switching condition. The reason thereof is as follows. The stable travel determination subroutine of Step S109 in the first judgment subroutine of Step S1 is used in a case of being AWD in which the slip AWD demand flag is set to "1", and the vehicle stability during travel growing worse than AWD in which the "lateral-G" AWD demand flag is set to "1". For this reason, the switching condition from AWD to 2WD is enhanced by increasing the counter value threshold, whereby it is made difficult to switch from AWD to 2WD, and vehicle stability is further ensured.

In Step S110 advanced from the stable travel determination subroutine 1 of Step S109, the ECU 6 determines whether the stable travel determination flag set by the stable travel determination of Step S109 is "1". In the case of this determination being YES, the processing advances to Step S111 due to the stability of the vehicle 3 being able to be ensured, the slip AWD demand flag is set to "0", and the first judgment subroutine is ended. In addition, in the case of this determination being YES, if the "lateral-G" AWD demand flag is "1", the "lateral-G" AWD demand flag is also set to "0", and the first judgment subroutine is ended. When setting the slip AWD demand flag and "lateral-G" AWD demand flag to "0" and ending the first judgment subroutine, although the slip AWD demand flag and "lateral-G" AWD demand flag are set to "0", the climbing AWD demand flag maintains the previous setting. In the case of being NO, the processing advances to Step S105, and after setting the slip AWD demand flag to "1", the first-judgment subroutine is ended.

In Step S2 advanced from the first judgment subroutine of Step S1, the ECU 6 determines whether the slip AWD demand flag is "1". In the case of this determination being YES, the processing advances to Step S3.

In the case of being NO, the processing advances to Step S7.

In Step S3, the ECU 6 switches the drive state of the vehicle 3 to AWD and excessive slip front/rear distribution setting. For example, it switches to AWD setting the front/rear distribution setting to 55:45 (ratio in case of total drive power set as 100).

In Step S4, the ECU 6 executes a third judgment subroutine 1. In the third judgment subroutine I, the climbing AWD demand flag is set to "1" or "0".

Figure 11:
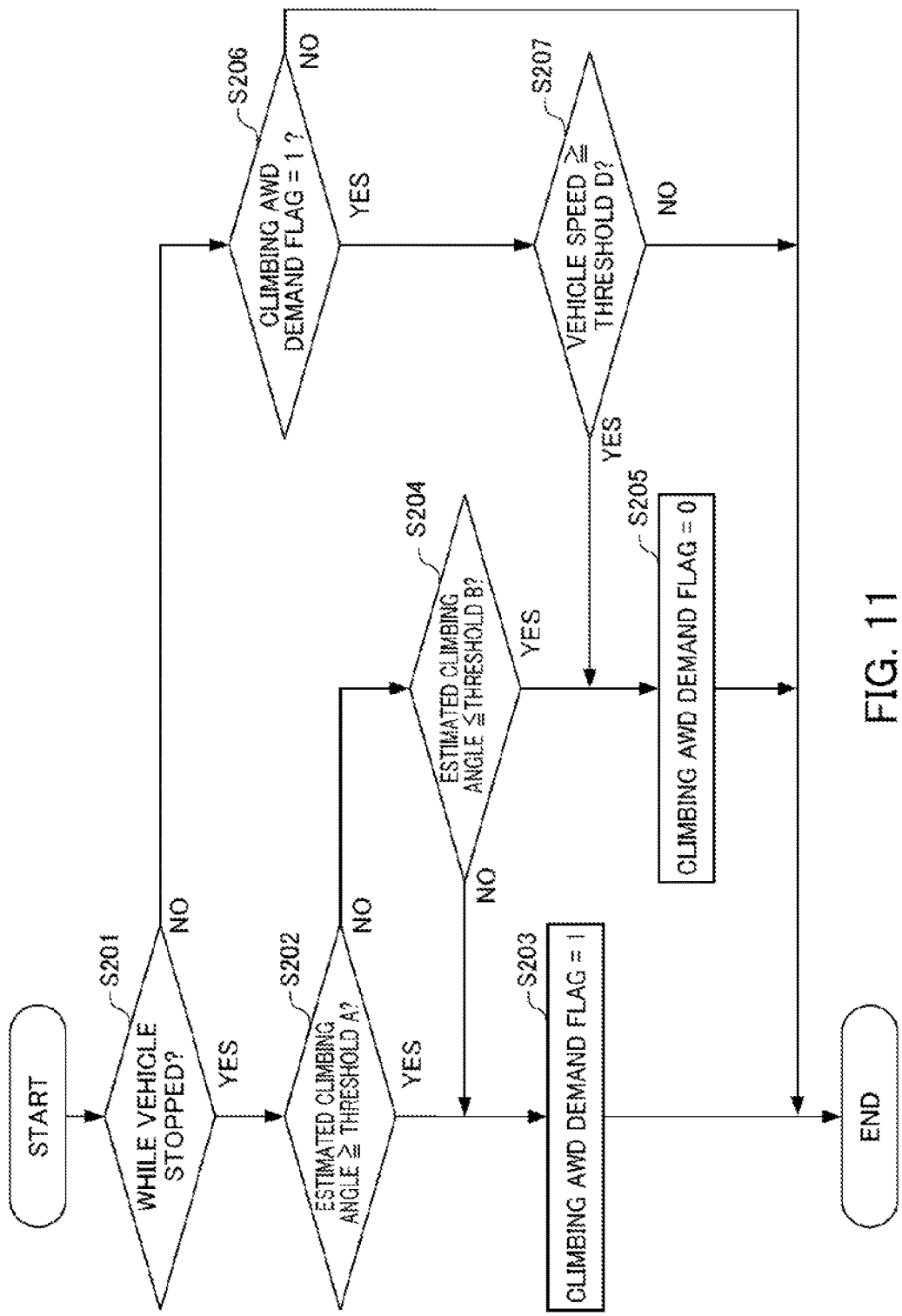
FIG. 11 is a flowchart showing the sequence of a third judgment subroutine according to the above-mentioned embodiment.

FIG. 11 is a flowchart showing the sequence of the third judgment subroutine 1 according to the present embodiment.

In Step S201, the ECU 6 determines whether the vehicle 3 is stopped. In the case of this determination being YES, the processing advances to Step S202 since the vehicle 3 is stopped, and the estimated climbing angle is compared with a climbing angle threshold A. In the case of being NO, the processing advances to Step S206 due to the vehicle 3 being traveling.

In Step S202, the ECU 6 determines whether the estimated climbing angle is at least the climbing angle threshold A. The estimated climbing angle is estimated from the detection value of the longitudinal G sensor 99. The climbing angle threshold A is set in advance to an appropriate value as an indicator for switching the drive state of the vehicle 3 to AWD and climbing front/rear distribution setting, when setting the climbing AWD demand flag to "1" via the third judgment unit 63. In the case of this determination being YES, the processing advances to Step S203. In the case of being NO, the processing advances to Step S204.

In Step S203, the ECU 6 sets the climbing AWD demand flag to "1", and ends the third judgment subroutine 1, Switching to AWD and climbing front/rear distribution setting is thereby executed. In other words, prioritizing over switching to AWD and excessive slip front/rear distribution setting by way of the slip AWD demand flag being set to "1" in Step S3, the climbing AWD demand flag is set to thereby forcibly switching to AWD and climbing front/rear distribution setting in Step S6 described later.

In Step S204, the ECU 6 determines whether the estimated climbing angle is no more than a climbing angle threshold B. The estimated climbing angle is estimated from the detection value of the longitudinal-G sensor 99. The climbing angle threshold B is set in advance to an appropriate value as an indicator for switching the drive state of the vehicle 3 to AWD and climbing front/rear distribution setting. The climbing angle threshold B is smaller than the climbing angle threshold A. In the case of this determination being YES, the processing advances to Step S205, the climbing AWD demand flag is set to "0", and the third judgment subroutine 1 is ended. In the case of being NO, the processing advances to Step S203, the climbing AWD demand flag is set to "1", and the third judgment subroutine 1 is ended.

It should be noted that Step S204 lengthens the judgment from Step S202 in the third judgment unit 63 so as to be able to process also in a case of the estimation error of the estimated climbing angle being large.

In Step S206, the ECU 6 determines whether the climbing AWD demand flag is "1". In the case of this determination being YES, the processing advances to Step S207. In the case of being NO, the third judgment subroutine 1 is ended. When ending the third judgment subroutine 1 in this step, switching to AWD and excessive slip front/rear distribution setting is executed. In other words, the switching to AWD and excessive slip front/rear distribution setting according to the slip AWD demand flag being set to "1" is maintained in Step S3.

In Step S207, the ECU 6 determines whether the vehicle speed detected by the vehicle speed sensor 96 is at least a vehicle speed threshold D. The vehicle speed threshold D is set in advance to an appropriate value as an indicator for switching the drive state of the vehicle 3 from the AWD and climbing front/rear distribution setting, when setting the climbing AWD demand flag to via the third judgment unit 63. For example, the vehicle speed threshold D is set to 20 km/h or the like at which leaving the stopped state is reliably understood. In the case of this determination being YES, the processing advances to Step S205, the climbing AWD demand flag is set to "0", and the third judgment subroutine 1 is ended. When ending the third judgment subroutine 1 by setting the climbing AWD demand flag to "0", switching to AWD and excessive slip front/rear distribution setting is executed. In other words, the switching to AWD and excessive slip front/rear distribution setting according to the slip AWD demand flag being set to "1" is maintained in Step S3. In the case of being NO, the third judgment subroutine 1 is ended while still maintaining the climbing AWD demand flag at "1".

In Step S5 advanced from the third judgment subroutine 1 of Step S4, the ECU 6 determines whether the climbing AWD demand flag is "1". In the case of this determination being YES, the processing advances to Step S6. In the case of being NO, the present routine is ended. When ending the present routine in this step, switching to AWD and excessive slip front/rear distribution setting is executed.

In Step S6, the ECU 6 switches the drive state of the vehicle 3 to AWD and climbing front/rear distribution setting. For example, it is switched to AWD setting the front/rear distribution setting to 50:50 (ratio in case of setting total drive power as 100). Then, the main routine is ended.

The ECU 6 forcibly switches to AWD and climbing front/rear distribution setting according to the climbing AWD demand flag being set to "1", prioritizing over switching to the AWD and excessive slip front/rear distribution setting according to the slip AWD demand flag being set to "1" in Step S3. In other words, the switching judgment of the third judgment unit 63 is prioritized over the switching judgment of the first judgment unit 61.

On the other hand, in Step S7, the ECU 6 executes a third judgment subroutine 2. In the third judgment subroutine 2, the climbing AWD demand flag is set to "1" or "0".

FIG. 11 is a flowchart showing the sequence of the third judgment subroutine 2 according to the present embodiment.

In Step S201, the ECU 6 determines whether the vehicle 3 is stopped. In the case of this determination being YES, the processing advances to Step S202 due to the vehicle 3 being stopped, and the estimated climbing angle is compared with the climbing angle threshold A. In the case of being NO, the processing advances to Step S206 due to the vehicle 3 being traveling.

In Step S202, the ECU 6 determines whether the estimated climbing angle is at least a climbing angle threshold A. The estimated climbing angle is estimated from the detection value of the longitudinal-G sensor 99. The climbing angle threshold A is set in advance to an appropriate value as an indicator for switching the drive state of the vehicle 3 to AWD and climbing angle front/rear distribution setting, when setting the climbing AWD demand flag to "1" via the third judgment unit 63. In the case of this determination being YES, the processing advances to Step S203, In the case of being NO, the processing advances to Step S204.

In Step S203, the ECU 6 sets the climbing AWD demand flag to "1" and ends the third judgment, subroutine 2. Switching to AWD and climbing front/rear distribution setting is thereby executed.

In Step S204, the ECU 6 determines whether the estimated climbing angle is no more than a climbing angle threshold B. The estimated climbing angle is estimated from the detection value of the longitudinal-G sensor 99. The climbing angle threshold B is set in advance to an appropriate value as an indicator for switching the drive state of the vehicle 3 to AWD and climbing front/rear distribution setting, when setting the climbing AWD demand flag to "1" via the third judgment unit 63. In the case of this determination being YES, the processing advances to Step S205, the climbing AWD demand flag is set to "0", and the third judgment subroutine 1 is ended. In the case of being NO, the processing advances to Step S205, the climbing AWD demand flag is set to "1", and the third judgment subroutine 1 is ended.

It should be noted that Step S204 lengthens the judgment from Step S202 in the third judgment unit 63 so that it can process in the case of the estimation error of the estimated climbing angle being large.

In Step S206, the ECU 6 determines whether the climbing AWD demand flag is "1". In the case of this determination being YES, the processing advances to Step S207. In the case of being NO, the third judgment subroutine 2 is ended. When ending the third judgment subroutine 2 in this step, the slip AWD demand flag and climbing AWD demand flag are "0". When ending the third judgment subroutine 2 in this step, the slip AWD demand flag and climbing AWD demand flag are "0".

In Step S207, the ECU 6 determines whether the vehicle speed detected by the vehicle speed sensor 96 is at least, a vehicle speed threshold D. The vehicle speed threshold D is set in advance to an appropriate value as an indicator for switching the drive state of the vehicle 3 from AWD and climbing front/rear distribution setting, when setting the climbing AWD demand flag to "0" via the third judgment unit 63. For example, the vehicle speed threshold D is set to 20 km/h or the like at which leaving the stopped state is reliably understood. In the case of this determination being YES, the processing advances to Step S205, the climbing AWD demand flag is set to "0", and the third judgment, subroutine 2 is ended. When ending the third judgment subroutine 2 by setting the climbing AWD demand flag to "0", the slip AWD demand flag and climbing AWD demand flag are "0". In the case of being NO, the third judgment subroutine 2 is ended while still maintaining the climbing AWD demand flag at "1".

In Step S8 advanced from the third judgment subroutine 2 of Step S7, the ECU 6 determines whether the climbing AWD demand flag is "1". In the case of this determination being YES, the processing advances to Step S3. In the case of being NO, the processing advances to Step S10.

In Step S9, the ECU 6 switches the drive state of the vehicle 3 to AWD and climbing front/rear distribution setting. For example, it is switched to AWD setting the front/rear distribution setting to 50:50 (ratio in case of setting total drive power as 100). Then, the present routine is ended.

In Step S10, the ECU 6 executes the second judgment subroutine. In the second judgment subroutine, the "lateral G" AWD demand flag is set to "1" or "0".

Figure 12:
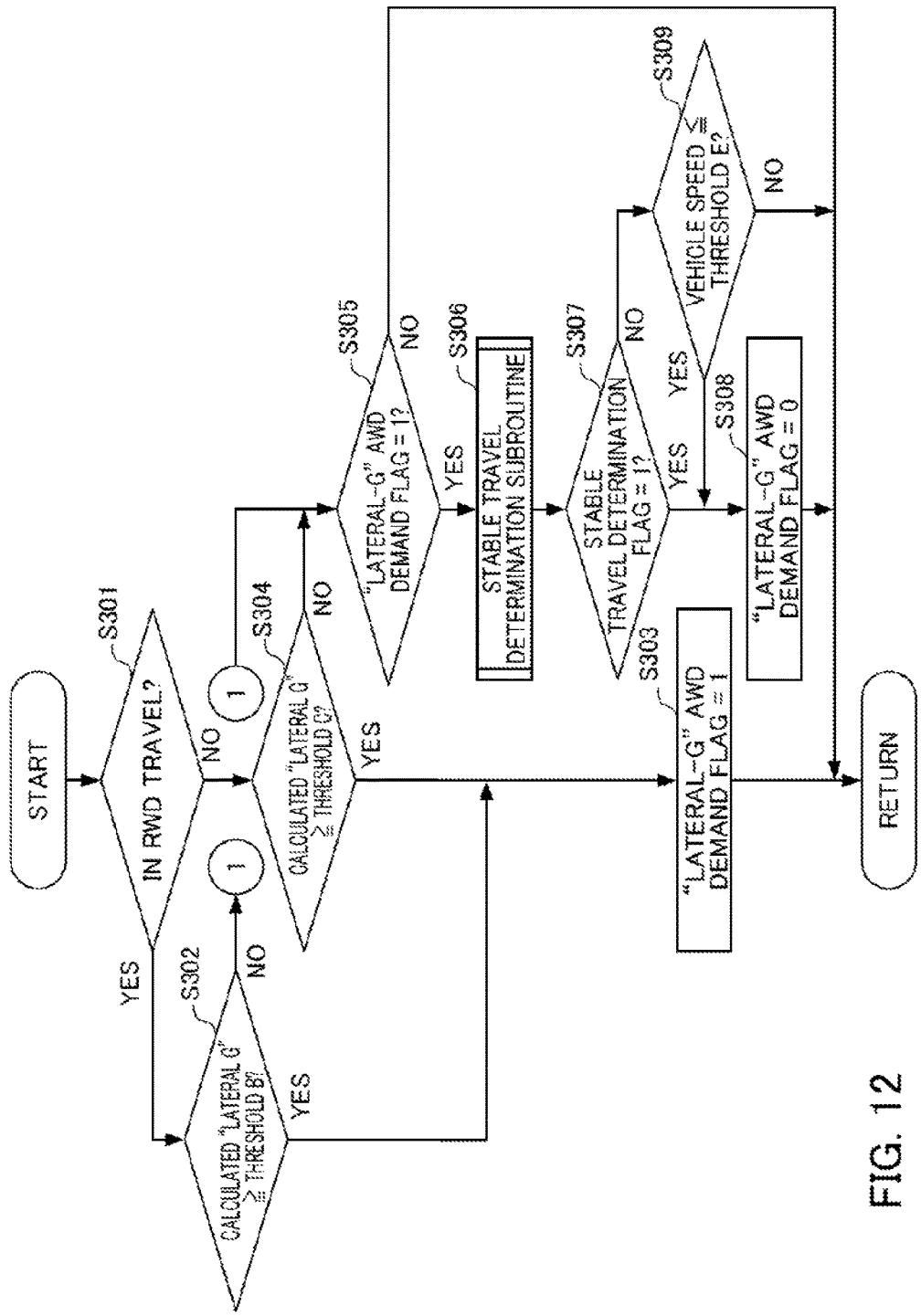
FIG. 12 is a flowchart showing the sequence of a second judgment subroutine according to the above-mentioned embodiment.

FIG. 12 is a flowchart showing the sequence of the second judgment subroutine according to the present embodiment.

In Step S301, the ECU 6 determines whether the vehicle 3 is in RWD. In the case of this determination being YES, the processing advances to Step S302 due to the vehicle 3 being in RWD, and the calculated "lateral G" is compared with the lateral-G threshold B. In the case of being NO, the processing advances to Step S304 due to the vehicle 3 being in FWD or AWD.

In Step S302, the ECU 6 determines whether the calculated "lateral G" is at least the lateral-G threshold B. The calculated "lateral G" is calculated from the detection value of the lateral-G sensor 95, etc. The lateral-G threshold B is set in advance to an appropriate value as an indicator for switching the drive state of the vehicle 3 to AWD and lateral-G front/rear distribution setting, when setting the "lateral G" AWD demand flag to "1" via the second judgment unit 62. In the case of this determination being YES, the processing advances to Step S303. In the case of being NO, the processing advances to Step S305.

In Step S303, the ECU 6 sets the "lateral G" AWD demand flag to "1", and ends the second judgment subroutine. Switching to AWD and lateral-G front/rear distribution setting is thereby executed.

On the other hand, in Step S304, the ECU 6 determines whether the calculated "lateral G" is at least a lateral-G threshold C. The calculated "lateral G" is calculated from the detection value of the lateral-G sensor 95, etc. The lateral-G threshold C is set in advance to an appropriate value as an indicator for switching the drive state of the vehicle 3 to AWD and lateral-G front/rear distribution setting, when setting the "lateral-G" AWD demand flag to "1" via the second judgment unit 62. The lateral-G threshold C is larger than the lateral-G threshold B due to FWD and AWD having more of an under steer tendency than RWD, and the vehicle stability increasing. In the case of this determination being YES, the processing advances to Step S303, and after setting the "lateral-G" AWD demand flag to "1", the second judgment subroutine is ended. In the case of being NO, the processing advances to Step S305.

In Step S305, the ECU 6 determines whether the "lateral-G" AWD demand flag is "1". In the case of this determination being YES, the processing advances to Step S306. In the case of being NO, the second judgment subroutine is ended. When ending the second judgment subroutine in this step, the slip AWD demand flag, climbing AWD demand flag and "lateral-G" AWD demand flag are "0".

In Step S306, the ECU 6 determines whether the vehicle 3 is stably traveling according to the stable travel determination subroutine 2 of the stable travel determination unit 65. When determined that the vehicle 3 is stably traveling, the stable travel determination flag is set to "1", and when determined as not stably traveling, the stable travel determination flag is set to "0".

FIG. 9 is a flowchart showing the sequence of the stable travel determination subroutine 2 according to the present embodiment.

In Step S1101, the ECU 6 determines whether the steering-wheel angular velocity calculated by time differentiating the steering wheel angle according to the steering angle sensor 97 is smaller than a steering-wheel angular velocity threshold. The steering-wheel angular velocity threshold is set in advance to an appropriate value as an indicator for setting the stable travel determination flag to "1" via the stable travel determination unit 65. In the case of this determination being YES, the processing advances to Step S1102. In the case of being NO, the processing advances to Step S1109, the counter value is reset to "0", the processing advances to Step S1110, and after setting the stable travel determination flag to "0", the stable travel determination subroutine is ended.

In Step S1102, the ECU 6 determines whether the yaw rate G calculated by multiplying the yaw rate detected by the yaw-rate sensor 98 and the vehicle speed detected by the vehicle speed sensor 96 is less than the yaw rate-G threshold. The yaw rate-G threshold is set in advance to an appropriate value as an indicator for setting the stable travel determination flag to "1" via the stable travel determination unit 65. In the case of this determination being YES, the processing advances to Step S1103. In the case of being NO, the processing advances to Step S1109, the counter value is reset to "0", the processing advances to Step S1110, and after setting the stable travel determination flag to "0", the stable travel determination subroutine is ended.

In Step S1103, the ECU 6 determines whether the calculated "lateral G" is less than the lateral-G threshold A. The calculated "lateral G" is calculated from the detection value of the lateral-G sensor 95, etc. The lateral-G threshold A is set in advance to an appropriate value as an indicator for setting the stable travel determination flag to "1" via the stable travel determination unit 65. In the case of this determination being YES, the processing advances to Step S1104. In the case of being NO, the processing advances to Step S1109, the counter value is reset to "0", the processing advances to Step S1110, and after setting the stable travel determination flag to "0", the stable travel determination subroutine is ended.

In Step S1104, the ECU 6 determines whether the vehicle speed detected by the vehicle speed sensor 96 is greater than the vehicle speed threshold B and less than the vehicle speed threshold C. The vehicle speed thresholds B and C are set in advance to appropriate values as indicators for setting the stable travel determination flag to "1" via the stable travel determination unit 65. In the case of this determination being YES, the processing advances to Step S1105. In the case of being NO, the processing advances to Step S1109, the counter value is reset to "0", the processing advances to Step S1110, and after setting the stable travel determination flag to "0", the stable travel determination subroutine is ended.

In Step S1105, the ECU 6 determines whether the wheel acceleration calculated by time differentiating the wheel speed detected by the wheel speed sensor 91 is less than the wheel speed threshold. The wheel acceleration threshold is set in advance to an appropriate value as an indicator for setting the stable travel determination flag to "1" via the stable travel determination unit 65. In the case of this determination being YES, the processing advances to Step S1106. In the case of being NO, the processing advances to Step S1109, the counter value is reset to "0", the processing advances to Step S1110, and after setting the stable travel determination flag to "0", the stable travel determination subroutine is ended.

It should be noted that, as shown in FIG. 10, the wheel acceleration threshold of Step S1105 in the stable travel determination subroutine of Step S306 in the second judgment subroutine of Step S10 is larger than the wheel acceleration threshold of Step S1105 in the stable travel determination subroutine of Step S109 in the first judgment, subroutine of the aforementioned Step S1. This threshold constitutes a second switching condition. The reason thereof is as follows. The stable travel determination subroutine of Step S306 in the second judgment subroutine of Step S10 is used in a case of being AWD in which the "lateral G" AWD demand flag is set to "1", and the vehicle stability during travel growing worse than AWD in which the slip AWD demand flag is set to "1". For this reason, the switching condition from AWD to 2WD is relaxed by increasing the wheel acceleration threshold, whereby it tends to switch from AWD to 2WD, and vehicle stability is further ensured.

In Step S1106, the ECU 6 increments (+1) the counter value. After this step, the processing advances to Step S1109, the counter value is reset to "0", the processing advances to Step S1110, and after setting the stable travel determination flag to "0", the stable travel determination subroutine is ended.

In Step S1107, the ECU 6 determines whether the counter value is greater than a counter value threshold. The counter value threshold is set in advance to an appropriate value, as an indicator for setting the stable travel determination flag to "1" via the stable travel determination unit 65. In the case of this determination being YES, the processing advances to Step S1108, and after setting the stable travel determination flag to "1", the stable travel determination subroutine is ended. In the case of being NO, the processing advances to Step S1110, and after setting the stable travel determination flag to "0", the stable travel determination subroutine is ended.

It should be noted that, as shown in FIG. 10, the counter value threshold of Step S1107 in the stable travel determination subroutine of Step S306 in the second judgment-subroutine of Step S10 is less than the counter value threshold of Step S1107 in the stable travel determination subroutine of Step S109 in the first judgment, subroutine of the aforementioned Step S1. This threshold constitutes a second switching condition. The reason thereof is as follows. The stable travel determination subroutine of Step S306 in the second judgment subroutine of Step S10 is used in the case of being AWD in which the "lateral G" AWD demand flag is set to "1", and the vehicle stability during travel not growing worse than AWD in which the slip AWD demand flag is set to "1". For this reason, the switching condition from AWD to 2WD is relaxed by decreasing the counter value threshold, whereby it tends to switch from AWD to 2WD, and vehicle stability is further ensured.

In Step S307, the ECU 6 determines whether the stable travel determination flag set according to the stable travel determination of Step S306 is "1". In the case of this determination being YES, the processing advances to Step S308 due to being able to ensure the stability of the vehicle 3, and after setting the "lateral G" AWD demand flag to "0", the second judgment subroutine is ended. Herein, setting of the slip AWD demand flag is not conducted. When ending the second judgment subroutine in this step, the slip AWD demand flag, climbing AWD demand flag and "lateral G" AWD demand flag are "0". In the case of being NO, the processing advances to Step S309.

In Step S309, the ECU 6 determines whether the vehicle speed detected by the vehicle speed sensor 96 is no more than a vehicle speed threshold E. The vehicle speed threshold E is set in advance to an appropriate value, as an indicator for switching the drive state of the vehicle 3 from the AWD and lateral-G front/rear distribution setting, when setting the "lateral-G" AWD demand flag to "0" via the second judgment unit 62. In the case of this determination being YES, the processing advances to Step S308, the "lateral G" AWD demand flag is set to "0", and the second judgment subroutine is ended. When ending the second judgment subroutine by setting the "lateral G" AWD demand flag to "0", the slip AWD demand flag, climbing AWD demand flag and "lateral G" AWD demand flag are "0". In the case of being MO, the second judgment subroutine is ended while still maintaining the "lateral G" AWD demand flag at "1".

In Step S11 advanced from the second judgment subroutine of Step S10, the ECU 6 determines whether the "lateral G" AWD demand flag is "1". In the case of this determination being YES, the processing advances to Step S12. In the case of being NO, the processing advances to Step S13.

In Step S12, the ECU 6 switches the drive state of the vehicle 3 to AWD and lateral-G front/rear distribution setting. For example, it is switched to AWD setting the front/rear distribution setting to 60:40 (ratio in case of setting total drive power as 100).

The ECU 6 switches to the AWD and lateral-G front/rear distribution setting according to the "lateral G" AWD demand flag being set to "1", after entering a state in which it is determined that the slip AWD demand flag is "0" in Step S2 and not switching to AWD and excessive slip front/rear distribution setting. In other words, the switching judgment of the first judgment unit 61 is prioritized over the switching judgment of the second judgment unit 62.

In Step S13, various AWD demand flags are set to "0", and the ECU 6 executes switching of the drive state of the vehicle 3 to 2WD, i.e. FWD or RWD.

The following effects are exerted according to the present embodiment.

In the present embodiment, the slip AWD demand flag is set to "1" based on the integrated slip point acquired by the integrated slip point calculation section 61c of the first judgment unit 61, and after switching from 2WD to AWD, the slip AWD demand flag is set to "0" upon the first switching condition being established, thereby switching from AWD to 2WD. In addition, the "lateral G" AWD demand flag is set to "1" based on the calculated "lateral G" acquired by the lateral-G calculation section 62a of the second judgment unit 62, and after switching from 2WD to AWD, the "lateral G" AWD demand flag is set to "0" upon the second switching condition being established, thereby switching from AWD to 2WD. Then, the first switching condition for setting the slip AWD demand flag to "0", and the second switching condition for setting the "lateral G" AWD demand flag to "0" are made to differ.

It is thereby possible to switch from AWD to 2WD at a more appropriate timing, due to switching to 2WD based on the first switching condition for setting the previous slip AWD demand flag to "1" or the second switching condition for setting the "lateral G" AWD demand flag to "1".

For example, in a case of setting the slip AWD demand flag from "1" to "0" by the first switching condition being established, and thus switching from AWD to 2WD, it is possible to switch to 2WD at a timing depending on the excessive slip phenomenon occurring in the vehicle 3, For example, it becomes 2WD at the timing at which the first-switching condition tuned to the road surface departing from a road surface of low p state is established, and thus can ensure vehicle stability.

In the case of setting the "lateral G" AWD demand flag from "1" to "0" by the second switching condition being established, and thus switching from AWD to 2WD, it is possible to switch to 2WD at a timing at which the lateral G's occurring in the vehicle 3 have relaxed. For this reason, it becomes 2WD at a timing at which the second switching condition at which the lateral G's occurring in the vehicle 3 have relaxed is established, and thus the vehicle stability can be ensured.

In addition, the timing of switching from AWD to 2WD based on the first switching condition or the second switching condition is a case of setting the slip AWD demand flag to "0" or a case of setting the "lateral G" AWD demand flag to "0", and thus with the drive-state switching unit 64, it is not limited to the vehicle 3 being stopped or traveling. For this reason, the switching from AWD to 2WD becomes a timing adapted according to various cases, and it is possible to ensure vehicle stability. Switching from AWD to 2WD is thereby effectively performed while ensuring vehicle stability at a more appropriate timing, not only when the vehicle 3 is stopped, but also when traveling, and thus it is possible to improve driving efficiency.

In the present embodiment, in the case of the drive-state switching unit 64 setting the slip AWD demand flag to "1" in AWD switched after setting the "lateral G" AWD demand flag to "1", it switches to AWD after setting the slip AWD demand flag to "1", and switches to 2WD by setting the slip AWD demand flag and the "lateral G" AWD demand flag to "0" with the first switching condition.

Herein, generally, the vehicle 3 has a tendency for vehicle stability to decline more with AWD corresponding to the excessive slip phenomenon than AWD corresponding to lateral G's occurring in the vehicle 3. According to the present embodiment, in the case of the excessive slip phenomenon occurring in AWD corresponding to lateral G's occurring in the vehicle 3, it switches to AWD corresponding to the excessive slip phenomenon for which there is a tendency for vehicle stability to further decline. Then, it switches to 2WD from AWD switched to correspond to the excessive slip phenomenon for which there is a tendency for vehicle stability to further decline, by setting the slip AWD demand flag and the "lateral G" AWD demand flag in the first switching condition to "0", whereby it is possible to further ensure vehicle stability.

In the present embodiment, the drive-state switching unit 64 sets the first switching condition, which sets the slip AWD demand flag and the "lateral G" AWD demand flag to "0" to a condition for which it is more difficult to switch than the second switching condition, which only sets the "lateral G" AWD demand flag to "0".

Herein, generally, the vehicle 3 has a tendency for vehicle stability to decline more with AWD corresponding to the excessive slip phenomenon than AWD corresponding to lateral G's occurring in the vehicle 3. According to the present embodiment, the first switching condition that sets the slip AWD demand flag and the "lateral G" AWD demand flag to "0" is set as a condition that is more difficult to switch than the second switching condition that switches only the "lateral G" AWD demand flag to "0", and thus it is difficult to switch to 2WD from AWD switched to correspond to the excessive slip phenomenon which has a tendency for the vehicle stability to decline using the first switching condition, and thus vehicle stability can be further ensured.

In the present embodiment, when the vehicle 3 is stopped, the drive-state switching unit 64 switches to 2WD from AWD setting the slip AWD demand flag to "0", based on the integrated slip point acquired by the integrated slip point calculation section 61a and the vehicle speed of the vehicle 3.

In other words, until the vehicle speed of the vehicle 3 is at least the vehicle speed threshold A and the integrated slip point acquired by the integrated slip point calculation section 61a is no more than the excessive slip threshold B in AWD, the drive-state switching unit 64 maintains AWD entered by setting the slip AWD demand flag to "1" or inhibits switching to 2WD entered by setting the slip AWD demand flag to "0".

Herein, the first judgment unit 61 may determine the vehicle stability as stable when the vehicle 3 is stopped. In other words, the integrated slip point calculation section 61c may cause the integrated slip point to decline when the vehicle 3 is stopped, and the first judgment unit 61 may determine the vehicle stability as being stable. According to the present embodiment, when the vehicle 3 is stopped for which it may be determined that the vehicle stability is stable, it maintains AWD entered by setting the slip AWD demand flag to "1" or inhibits switching to 2WD entered by setting the slip AWD demand flag to "0", until the vehicle speed of the vehicle 3 is at least the vehicle speed threshold A and the integrated slip point acquired by the integrated slip point calculation section 61a is no more than the excessive slip threshold B in AWD. Therefore, when the vehicle 3 is stopped, since the accuracy of switching judgment is increased by adding the switching condition to 2WD with the integrated slip point acquired by the integrated slip point, calculation section 61c and the vehicle speed of the vehicle 3 as parameters, it is possible to further ensure vehicle stability.

It should be noted that the present invention is not to be limited to the above-mentioned embodiments, and that modifications, improvements, etc. within a scope capable of achieving the objects of the present invention are also encompassed by the present invention.

In addition, in the present embodiment, various AWD demand flags are set to "0" in Step S13, whereby the drive state of the vehicle 3 is switched to 2WD. At this time, 2WD is not particularly limited to FWD or RWD. However, the present invention is not particularly limited thereto. In Step S13, FWD or RWD may be selected in response to various AWD demand flags previously set to "1".

In addition, in the above-mentioned embodiments, although only the electric motors 2A, 2B are established as the drive source of the rear wheels, they may also be engine driven.

In addition, in the above-mentioned embodiments, although the second drive device 2 on the rear wheel side is established as a two motor system possessing the two electric motors 2A, 2B, it may be a one motor system.

EXPLANATION OF REFERENCE NUMERALS 1 first drive device
2 second drive device
3 vehicle
6 ECU (control device)
10 vehicle drive system
61 first judgment unit (first judgment means)
62 second judgment unit (second judgment means)
64 drive-state switching unit

The invention claimed is:

1. A vehicle drive system comprising:
a first drive device that drives a first drive wheel which is either one of a front wheel and a rear wheel of a vehicle;
a second drive device that drives a second drive wheel which is the other one of the front wheel and the rear wheel of the vehicle; and
a control device that controls the first drive device and the second drive device, and controls a drive state of the first drive wheel and the second drive wheel, the control device being configured to:
acquire a slip-correlation amount correlated with excessive slip occurring in the vehicle;
acquire a lateral acceleration amount correlated with turning direction movement or lateral movement of the vehicle; and
switch between an independent one side wheel drive state driving the vehicle by only either one of the first drive device or the second drive device, and a both side wheel drive state driving the vehicle by both of the first drive device and the second drive device,
wherein the switch further includes:
a first both side wheel drive switching to switch from the independent one side wheel drive state to the both side wheel drive state, based on the slip-correlation amount;
a second both side wheel drive switching to switch from the independent one side wheel drive state to the both side wheel drive state, based on the lateral acceleration amount;
a first independent one side wheel drive switching to switch from the both side wheel drive state to the independent one side wheel drive state with a first switching condition, after the first both side wheel drive switching processing; and
a second independent one side wheel drive switching to switch from the both side wheel drive state to the independent one side wheel drive state with a second switching condition, after the second both side wheel drive switching processing,
wherein the first switching condition and the second switching condition differ from one another.

2. The vehicle drive system according to claim 1, wherein the control device is further configured to switch to the both side wheel drive state after the first both side wheel drive switching, in a case of a condition for the first both side wheel drive switching being established in the both side wheel drive state after the second both side wheel drive switching, and executes the first independent one side wheel drive switching with the first switching condition.

3. The vehicle drive system according to claim 1, wherein the control device is further configured to set the first switching condition as a condition for which switching is more difficult than the second switching condition.

4. The vehicle drive system according to claim 1, wherein the first independent one side wheel drive switching is based on the slip-correlation amount and a speed correlation amount of the vehicle, in a case of the speed correlation amount of the vehicle becoming no more than a first speed threshold.

5. The vehicle drive system according to claim 2, wherein the control device is further configured to set the first switching condition as a condition for which switching is more difficult than the second switching condition.

6. The vehicle drive system according to claim 2, wherein the first independent one side wheel drive switching is based on the slip-correlation amount and a speed correlation amount of the vehicle, in a case of the speed correlation amount of the vehicle becoming no more than a first speed threshold.

7. The vehicle drive system according to claim 3, wherein the first independent one side wheel drive switching is based on the slip-correlation amount and a speed correlation amount of the vehicle, in a case of the speed correlation amount of the vehicle becoming no more than a first speed threshold.

8. The vehicle drive system according to claim 5, wherein the first independent one side wheel drive switching is based on the slip-correlation amount and a speed correlation amount of the vehicle, in a case of the speed correlation amount of the vehicle becoming no more than a first speed threshold.

* * * * *